US012650913B2

(12) United States Patent
Dupuy et al.

(10) Patent No.: US 12,650,913 B2
(45) Date of Patent: Jun. 9, 2026

(54) STORAGE DRIVE ACTIVITY MONITOR

(71) Applicant: Lenovo (Singapore) Pte. Ltd., New Tech Park (SG)

(72) Inventors: James Michael Dupuy, Cary, NC (US); Omar Ali, Cary, NC (US); P. Daniel Kangas, Raleigh, NC (US); Jean J. Xu, Cary, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 253 days.

(21) Appl. No.: 18/508,573

(22) Filed: Nov. 14, 2023

(65) Prior Publication Data

US 2025/0156294 A1    May 15, 2025

(51) Int. Cl.
| | |
|---|---|
| *G06F 11/32* | (2006.01) |
| *G06F 11/30* | (2006.01) |
| *G06F 13/40* | (2006.01) |

(52) U.S. Cl.
CPC ........ *G06F 11/325* (2013.01); *G06F 11/3034* (2013.01); *G06F 13/409* (2013.01)

(58) Field of Classification Search
CPC ... G06F 11/325; G06F 11/3034; G06F 13/409
See application file for complete search history.

(56) References Cited

U.S. PATENT DOCUMENTS

| | | | | | |
|---|---|---|---|---|---|
| 5,790,374 | A | * | 8/1998 | Wong ................... | G02B 6/0005 |
| | | | | | 362/559 |
| 2006/0016384 | A1 | * | 1/2006 | Sturges ................... | H04L 67/75 |
| | | | | | 116/202 |
| 2010/0295833 | A1 | * | 11/2010 | Nishio ..................... | G06F 3/042 |
| | | | | | 345/207 |
| 2022/0244465 | A1 | * | 8/2022 | Winzer ................. | G02B 6/3825 |
| 2022/0358079 | A1 | * | 11/2022 | Mishra ...................... | G06F 1/08 |

* cited by examiner

*Primary Examiner* — Sisay Yacob
(74) *Attorney, Agent, or Firm* — Kunzler Needham Hilton

(57) ABSTRACT

An apparatus, system, and method for outputting status information of an internal storage drive. One apparatus includes a mounting tray configured to hold a storage drive, a light pipe coupled to a light-emitting diode (LED) of the storage drive, and a light sensing module coupled to the light pipe. The light sensing module is configured to receive a light signal from the LED, generate a serialized electrical signal based on the light signal, and output the serialized electrical signal to a bus controller, where the serialized electrical signal indicates status information of the storage drive.

20 Claims, 13 Drawing Sheets

200

300

Signal Generator
204

Comparator
302

Serializer
Expander
304

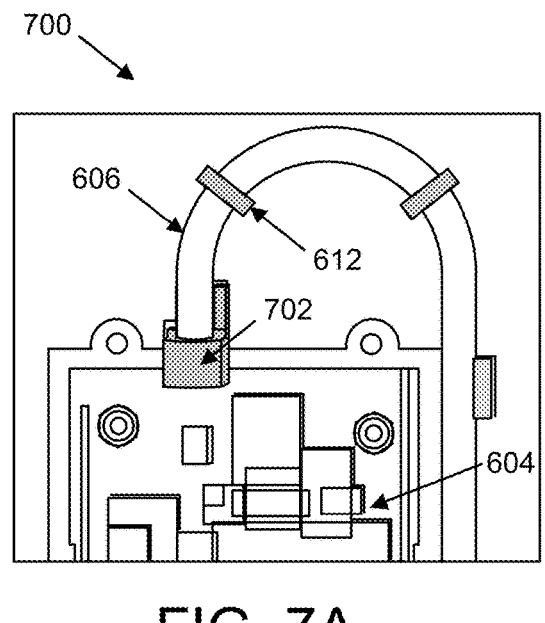
FIG. 7A
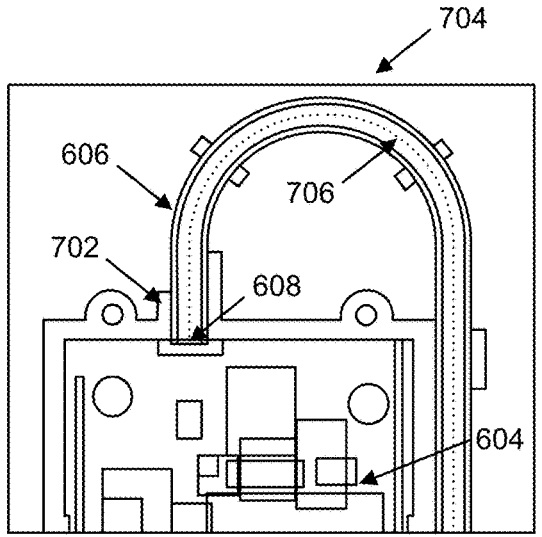
FIG. 7B
FIG. 8

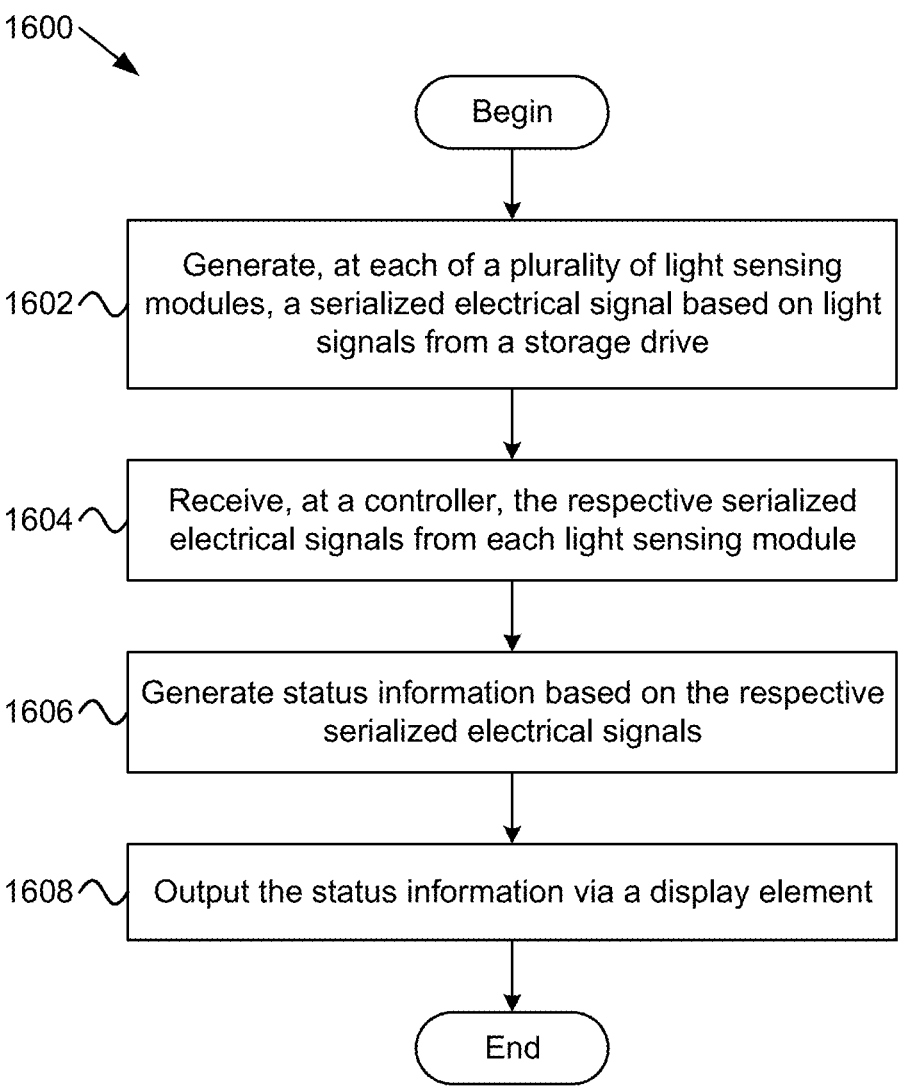

1600

Begin

1602 — Generate, at each of a plurality of light sensing modules, a serialized electrical signal based on light signals from a storage drive 1604 — Receive, at a controller, the respective serialized electrical signals from each light sensing module 1606 — Generate status information based on the respective serialized electrical signals 1608 — Output the status information via a display element End

FIG. 16

STORAGE DRIVE ACTIVITY MONITOR

FIELD

The subject matter disclosed herein relates to storage drives and more particularly relates to monitoring status or activity information of at least one storage drive.

BACKGROUND

Current computing systems may include one or more internally located storage drives. However, internally located storage devices with integrated LED activity cannot be seen from outside the system chassis. This invention provides a way to capture the disk activity LED and display the disk activity so that it can be seen from outside the system chassis.

BRIEF SUMMARY

Disclosed are techniques for outputting status information of an internal storage drive. Said techniques may be implemented by apparatus, systems, methods, or computer program products.

According to one aspect, an apparatus that supports techniques for outputting status information of an internal storage drive includes a mounting tray configured to hold a storage drive, a light pipe coupled to a light-emitting diode (LED) of the storage drive, and a light sensing module coupled to the light pipe. The light sensing module is configured to receive a light signal from the LED, generate a serialized electrical signal based on the light signal, and output the serialized electrical signal to a bus controller, where the serialized electrical signal indicates status information of the storage drive.

According to another aspect, a system that supports techniques for outputting status information of an internal storage drive includes system may include at least one drive unit, a display element, and a controller communicatively coupled to at least one light sensing module. Each drive unit includes a mounting tray configured to hold a storage drive, a light pipe coupled to a LED of the storage drive, and a light sensing module coupled to the light pipe and configured to generate a serialized electrical signal based on the light signal a light signal received from the LED, where the serialized electrical signal indicates activity of the storage drive. The controller is configured to receive a respective serialized electrical signal from each light sensing module, generate status information based on the respective serialized electrical signals, and output the status information via the display element.

According to a third aspect, a method for outputting status information of an internal storage drive includes generating, at each of a plurality of light sensing modules, a serialized electrical signal based on light signals from a storage drive, where the serialized electrical signal indicates activity of the storage drive. The method may include receiving, at a controller, the respective serialized electrical signals from each light sensing module and generating status information based on the respective serialized electrical signals. The method may include outputting the status information via a display element.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7A illustrates a detailed view of the arrangement of FIG. 6 in accordance with aspects of the present disclosure;

FIG. 7B illustrates a cut away view of the arrangement of FIG. 6 in accordance with aspects of the present disclosure;

FIG. 8 illustrates a perspective view of the arrangement of FIG. 6 in accordance with aspects of the present disclosure;

FIG. 16 illustrates one embodiment of a representative method for outputting status information of an internal storage drive in accordance with aspects of the present disclosure.

DETAILED DESCRIPTION

Figure 1:
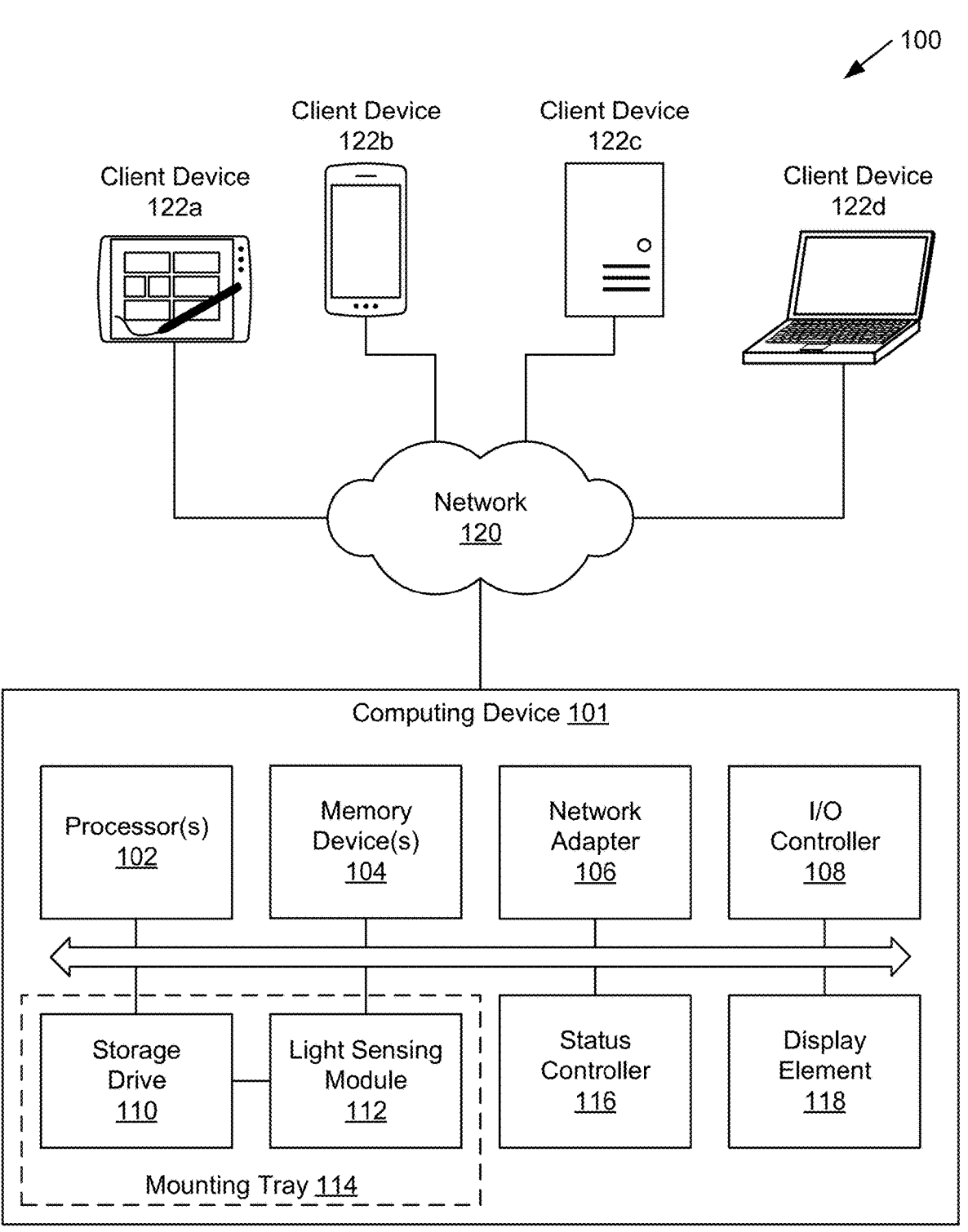
FIG. 1 illustrates one embodiment of a system that supports techniques for outputting status information of an internal storage drive in accordance with aspects of the present disclosure.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable logic array ("PLA"), programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM"), an electrically erasable programmable read-only memory ("EEPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")). In some embodiments, electronic circuitry including, for example, programmable logic circuitry, FPGAs, or PLAs may execute the computer readable program instructions by utilizing state information of the computer readable program instructions to personalize the electronic circuitry, in order to perform aspects of the present invention.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to flowchart illustrations and/or block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code or computer readable program instructions.

The code (e.g., computer readable program instructions) may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The code (e.g., computer readable program instructions) may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The code (e.g., computer readable program instructions) may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow diagrams, flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the call-flow, flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes apparatuses, systems, and methods that support techniques for outputting status information of an internal storage drive. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Internally located storage devices with integrated LED activity cannot be seen from outside the system chassis. The present disclosure describes solutions to capture the storage-related status and activity information (e.g., disk activity) presented at the integrated LED and display the status and activity information external to the system chassis, whereby a viewer can see the system status from outside the system chassis.

One approach is to use a light pipe to channel an optical signal from the storage device's integrated LED to an outside of the system chassis. However, this approach would result in signal loss (e.g., brightness loss), particularly in cases of long and/or complex piping topologies. Moreover, because different manufacturers use integrated LEDs of different wavelengths and/or brightness, this approach could also be aesthetically unpleasing due to different color values and or brightness values.

Accordingly, the present disclosure describes techniques for outputting status information of an internal storage drive. In various solutions, an optical sensor and signal conditioning circuitry are used to drive a display element on the system chassis. The optical sensor (and optionally the signal conditioning circuitry) may be located near the storage drive, whereby the storage drive's integrated LED activity activates the optical sensor. In some embodiments, the output from the optical sensor and signal conditioning circuitry is a digital signal used to drive the display element on the system chassis to present the status and activity information to the viewer, e.g., for diagnostic purposes.

Various embodiments of the solutions may sense whether a storage module LED is in an "On" state or an "Off" state. This sensing may be achieved via an optical sensor and a voltage comparator device. In some embodiments, a sensor output from the optical sensor is a voltage level. In such embodiments, the comparator senses the voltage level and compares it to a known threshold (i.e., dividing line) in voltage between the integrated LED's "On" and "Off" states. In certain embodiments, the comparator output is another voltage level, larger and stronger than the optical sensor so it can be transmitted down a cable, across a motherboard, and to the circuits that drive the workstation storage LEDs.

An apparatus, a system, and a method that support techniques for outputting status information of an internal storage drive are disclosed. According to one aspect of the disclosure, the apparatus may include A) a mounting tray configured to hold a storage drive; B) a light pipe coupled to a LED of the storage drive; and C) a light sensing module coupled to the light pipe, where the light sensing module is configured to: i) receive a light signal from the LED, ii) generate a serialized electrical signal based on the light signal, and iii) output the serialized electrical signal to a bus controller, the serialized electrical signal indicating status information of the storage drive.

In some embodiments, the light sensing module includes at least one photosensor and the light pipe includes A) an optical fiber affixed to the mounting tray, and B) first coupling member located at a first end of the optical fiber, such that the first coupling member surrounds the LED and isolates the light signal. In such embodiments, the mounting tray may include a second coupling member that aligns a second end of the optical fiber with the at least one photosensor, such that the second coupling member prevents ambient light from reaching the at least one photosensor.

In some embodiments, the apparatus further includes an end panel coupled to the mounting tray, where the end panel includes A) a socket connector coupled to the storage drive and configured to exchange electrical signals between the storage drive and a system host, B) a receptacle configured to hold the light sensing module, and C) a connector coupled with the light sensing module and the system host, where the bus controller is located at the system host. In such embodiments, the connector is configured to relay the serialized electrical signal. In certain embodiments, the end panel may further include an edge connector configured to be inserted into the system host, wherein the edge connector establishes a mechanical and electrical connection between the apparatus and the system host.

In some embodiments, the apparatus further includes a heatsink located adjacent to and coupled with the storage drive. In such embodiments, the light pipe may be located adjacent to the storage drive and between the heatsink and the mounting tray.

In some embodiments, the light sensing module may include A) a photosensor, B) a voltage comparator, and C) a serializer input/output expander that generates the serialized electrical signal based on a comparator output. In such embodiments, the voltage comparator may i) receive a sensor output from the photosensor, and ii) generate the comparator output based on the sensor output, where the comparator output includes a stable voltage level that digitizes the sensor output.

In certain embodiments, the serializer input/output expander is coupled to the bus controller via an Inter-Integrated Circuit ("I2C") bus. In further embodiments, to generate the serialized electrical signal, the serializer input/output expander may be configured to serialize the comparator output over time at a sampling frequency of the I2C bus.

According to another aspect of the invention, a system may include A) at least one drive unit, B) a display element; and C) a controller communicatively coupled to at least one light sensing module. In various embodiments, each drive unit includes: i) a mounting tray configured to hold a storage drive; ii) a light pipe coupled to a LED of the storage drive; and iii) a light sensing module coupled to the light pipe and configured to generate a serialized electrical signal based on the light signal a light signal received from the LED, where the serialized electrical signal indicates activity of the storage drive. In various embodiments, the controller is configured to: i) receive a respective serialized electrical signal from each light sensing module; ii) generate status information based on the respective serialized electrical signals; and iii) output the status information via the display element.

In some embodiments, the light sensing module includes at least one photosensor and the light pipe includes A) an optical fiber affixed to the mounting tray, and B) first coupling member located at a first end of the optical fiber, such that the first coupling member surrounds the LED and isolates the light signal. In such embodiments, the mounting tray may include a second coupling member that aligns a second end of the optical fiber with the at least one photosensor, such that the second coupling member prevents ambient light from reaching the at least one photosensor.

In some embodiments, the system further includes a backplane card panel including: i) the light sensing module; ii) a socket connector coupled to the storage drive; and iii) an edge connector coupled with the light sensing module and a system host, where the controller is located at the system host. In such embodiments, the connector is configured to relay the serialized electrical signal to the controller in the system host and to further relay electrical signals between the storage drive and the system host.

In some embodiments, the system further includes a heatsink located adjacent to and coupled with the storage drive. In such embodiments, the light pipe may be located adjacent to the storage drive and between the heatsink and the mounting tray.

In some embodiments, the light sensing module may include A) a photosensor, B) a voltage comparator, and C) a serializer input/output expander that generates the serialized electrical signal based on a comparator output. In such embodiments, the voltage comparator may i) receive a sensor output from the photosensor, and ii) generate the comparator output based on the sensor output, where the comparator output includes a stable voltage level that digitizes the sensor output.

In certain embodiments, the serializer input/output expander is coupled to the controller via an I2C bus. In further embodiments, to generate the serialized electrical signal, the serializer input/output expander may be configured to serialize the comparator output over time at a sampling frequency of the I2C bus.

In some embodiments, the display element includes a liquid crystal display (LCD) screen. In certain embodiments, to output the status information, the controller presents a text representation of the status information on the LCD screen. In other embodiments, to output the status information, the controller presents a virtual LED representation of the status information on the LCD screen.

In certain embodiments, to generate the status information, the controller is configured to combine activity information of multiple storage drives. In such embodiments, the display element includes a system unit LED indicating activities of a plurality of storage drives. In other embodiments, the display element includes multiple system unit LEDs, where there is a 1-to-1 mapping between storage drives and system unit LEDs. In various embodiments, the display element is located at the system host.

In some embodiments, to generate the status information, the controller is configured to de-serialize each respective serialized electrical signal. In various embodiments, the status information includes one or more of: A) an activity signal; B) a no-activity signal; C) a logging activity; D) a virtual LED signal; E) or a combination thereof.

According to a third aspect of the invention, a method may include generating, at each of a plurality of light sensing modules, a serialized electrical signal based on light signals from a storage drive, where the serialized electrical signal indicates activity of the storage drive. The method may include receiving, at a controller, the respective serialized electrical signals from each light sensing module and generating status information based on the respective serialized electrical signals. The method may include outputting the status information via a display element.

In some embodiments, generating the status information may include: i) receiving a sensor output from the photosensor, ii) creating a comparator output based on the sensor output, and iii) creating the serialized electrical signal based on the comparator output. In such embodiments, the comparator output may include a stable voltage level that digitizes the sensor output.

In certain embodiments, the respective serializer electrical signals are received via an I2C bus. In such embodiments, generating the serialized electrical signal may include serializing the comparator output over time at a sampling frequency of the I2C bus.

In some embodiments, the display element includes a liquid crystal display (LCD) screen. In certain embodiments, outputting the status information includes presenting a text representation of the status information on the LCD screen. In other embodiments, outputting the status information includes presenting a virtual LED representation of the status information on the LCD screen.

In certain embodiments, generating the status information includes combining activity information of multiple storage drives. In such embodiments, the display element includes a system unit LED indicating activities of a plurality of storage drives. In other embodiments, the display element includes multiple system unit LEDs, where there is a 1-to-1 mapping between storage drives and system unit LEDs.

In some embodiments, generating the status information includes de-serializing each respective serialized electrical signal at an embedded controller. In various embodiments, the status information includes one or more of: A) an activity signal; B) a no-activity signal; C) a logging activity; D) a virtual LED signal; E) or a combination thereof.

FIG. 1 depicts an exemplary system 100 for outputting status information of an internal storage drive, in accordance with aspects of the present disclosure. The system 100 is presented to show one example of an environment where an apparatus and method may be implemented in accordance with the embodiments of the disclosure. As depicted, the system 100 may include a computing device 101 comprising at least one processor 102, at least one memory device 104, at least one network adapter 106, at least one input/output (I/O) controller 108, at least one storage drive 110, at least one light sensing module 112, at least one status controller 116, and at least one display element 118. In various embodiments, the computing device 101 may include at least one mounting tray 114, where at least one storage drive 110 and at least one light sensing module 112 may be located in a respective mounting tray 114. In some embodiments, the computing device 101 may be an enterprise server and/or a server in a data center. In other embodiments, the computing device 101 may be a workstation.

The processor(s) 102 may be operably connected to the memory device(s) 104. The memory device(s) 104 may include one or more non-volatile storage devices such as hard drives, solid state drives, CD-ROM drives, DVD-ROM drives, tape drives, or the like. The memory device(s) 104 may also include non-volatile memory such as a read-only memory (e.g., ROM, EPROM, EEPROM, and/or Flash ROM) or volatile memory such as a random access memory (e.g., RAM or operational memory). A computer bus, or plurality of buses, may interconnect the processor(s) 102, memory device(s) 104, the network adapter(s) 106, the I/O controller(s) 108, the storage drive(s) 110, the light sensing module(s) 112, the status controller(s) 116, and the display element(s) 118, and other devices to enable data and/or instructions to pass therebetween.

To enable communication with external systems or devices, the computing device 101 may include one or more I/O controllers 108. Such I/O controller(s) 108 may be embodied as wired ports (e.g., USB ports, serial ports, Firewire ports, SCSI ports, parallel ports, etc.) or wireless ports (e.g., Bluetooth, IrDA, etc.). The I/O controller(s) 108 may enable communication with one or more input devices (e.g., keyboards, mice, touchscreens, cameras, microphones, scanners, storage devices, etc.) and output devices (e.g., displays, monitors, speakers, printers, storage devices, etc.). The I/O controller(s) 108 may also enable communication with other computing devices 101.

In certain embodiments, the computing device 101 includes a wired or wireless network adapter 106 to connect the computing device 101 to a computer network 120, such as a LAN, WAN, or the Internet. Such a computer network 120 may enable the computing device 101 to connect to one or more servers, workstation, mobile computing devices, or other devices. Via the computer network 120, the computing device 101 may be interact with one or more communication client devices, such as a table computer 122a, a mobile phone 122b, a workstation or personal computer 122c, and/or laptop 122d (referred to collectively as "client devices" 122). While not depicted in FIG. 1, the system 100 may include—or be coupled to—various telecommunications equipment, such as email servers, communications servers, routers, switches, gateways, and other network elements and networking devices.

The system 100 is representative of various systems where the embodiments described herein may be deployed. The computing device 101, in some embodiments, is in a data center. In other embodiments, the computing device 101 is user owned. While a single light sending module 112 (and storage drive 110) is depicted, one of skill in the art will recognize that multiple light sensing modules 112 (i.e., each coupled to a respective storage drive 110) may be deployed on the computing devices 101.

In some embodiments, the computing device 101 may be a rack-mounted server, a workstation, a mainframe computer, a desktop server, a laptop server, and the like or any combination thereof. In such embodiments, the computing device 101 includes one or more processors, memory, data buses, access to non-volatile data storage, I/O connections, and the like. One of skill in the art will recognize other implementations of a computing device 101 comprising at least one storage drive 110, at least one light sensing module 112, and at least one status controller 116.

The peer devices 122 are depicted as a tablet computer, a smartphone, a desktop computer, and a laptop computer as examples but may be implemented by a workstation, a terminal, or other computing device capable of connection to the computing device 101 over the computer network 120. In some embodiments, a peer device 122 is used by a system administrator for monitoring, installation, maintenance, control, etc., of a storage drive 110 coupled to a light sensing module 112. In other embodiments, the peer devices 122 are user devices for using the storage drive(s) 110. For example, a user may use a smartphone as a peer device 122 to interact with the storage drive 110 of the computing device 101.

In various embodiments, the computer network 120 connects one or more peer devices 122 to the computing device 101 to access the storage drive(s) 110. The computer network 120 includes one or more networks. For example, the computer network 120 may include a LAN and may include a gateway to the Internet. The computer network 120 network may include cabling, optical fiber, etc. and may also include a wireless connection and may include a combination of network types. The computer network 120 may include a LAN, a WAN, a storage area network ("SAN"), an optical fiber network, etc. Various computer networks that are part of the depicted computer network 120 may be private and/or public, for example, through an Internet Service Provider.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDAR"). Alternatively, the wireless connection may be a cellular telephone network communication. All standards and/or connection types include the latest version and revision of the standard and/or connection type as of the filing date of this application.

In various embodiments, the storage drive 110 comprises a solid state memory device, e.g., comprising flash memory or another non-volatile computer memory storage medium. In addition, the storage drive 110 may include one or more LEDs located on a surface of the storage drive 110. As discussed in greater detail below, these LEDs may be used to indicate activity information and other status information of the storage drive 110.

The light sensing module 112 includes at least one photosensor and circuitry to generate a serialized electrical signal based on an optical signal. In certain embodiments, the light sensing module 112 may include one or more optical filters to isolate an optical signal at a desired frequency from other sources of light. The light sensing module 112 is described in greater detail below.

A respective storage drive 110 is optically coupled to a respective light sensing module 112. In various embodiments, a light pipe is used to optically couple each storage drive 110 to its respective light sensing module 112. In one embodiment, the light pipe may be a rigid component, e.g., made from a clear/transparent polymer (plastic) part. In another embodiment, the light pipe may be a flexible part, e.g., a fiber optic cable. In some embodiments, the light pipe provides an optical pathway between the LED(s) of the storage drive 110 and a photosensor of the light sensing module 112.

In various embodiments, the mounting tray 114 provides physical/mechanical connectors to couple a storage drive 110 to the computing device 101. For example, one or more storage drives 110 may be mounted to the mounting tray 114, and the mounting tray 114 may attach to a drive bay of the computing device 101. In certain embodiments, the mounting tray 114 may also be referred to as a rack tray. In various embodiments, the mounting tray 114 is configured to retain the light pipe (e.g., optical fibers) used to couple the storage drive 110 to a photosensor of the light sensing module 112. In such embodiments, the light pipe may mount to the mounting tray 114 for direct alignment with an LED of the storage drive 110 and a sensor of the light sensing module 112.

In some embodiments, the mounting tray 114 is configured to locate an edge connector of the storage drive 110 at a slot or socket connector of the computing device 101. In one embodiment, the slot or socket connector is part of a motherboard of the computing device 101. In another embodiment, the slot or socket connector is part of a backplane card that interfaces with the motherboard.

Each light sensing module 112 is communicatively coupled with the status controller 116. Here, the status controller 116 receives a respective electrical signal from each light sensing module 112 and generates status information based on the respective electrical signals. In certain embodiments, the respective electrical signals are serialized electrical signals that indicate the activity of a particular storage drive.

The status controller 116 is also coupled with the at least one display element(s) 118. Accordingly, the status controller 116 may control the at least one display element(s) 118 to output the generated status information. In some embodiments, the display element(s) 118 comprise an LCD screen, e.g., a 1 inch (2.5 cm) diagnostic LCD screen on the front of a chassis enclosing the computing device 101. In certain embodiments, to output the status information, the controller presents a text representation of the status information on the LCD screen. In other embodiments, to output the status information, the controller presents a virtual LED representation of the status information on the LCD screen.

In some embodiments, to generate the status information, the status controller 116 may combine activity information of multiple storage drives 110. In such embodiments, the display element(s) 118 includes a system-unit LED indicating activities of the multiple storage drives 110, e.g., presenting multiple storage drive activity using one LED. In other embodiments, the display element(s) 118 includes multiple system-unit LEDs, where there is a 1-to-1 mapping between storage drives 110 and system-unit LEDs.

For internal storage drives 110 which have integrated LEDs, the aspects of the present disclosure allow remote viewing of the storage drive activity and/or status information using remote LED(s) (i.e., located on the workstation/system chassis instead, which are then visible to the outside users and can see the storage drive status. The additional benefit provided is that the workstation manufacturer can control the system unit LED part numbers designed into the workstation, so as to ensure the LED colors all match (i.e., the color frequencies are the same) and same brightness.

It is a chronic problem in the industry where a "Green" or "Amber" or "Blue" named LED parts may all vary slightly in brightness or actual color (frequency), so when multiple storage devices (with integrated LED) are all lined up together and visible to the user, that set of LEDs can look pretty ugly, all being different. Customers often flag this as a quality issue despite the integrated LEDs being within specification for their respective vendors.

In accordance with aspects of the present disclosure, the integrated LEDs of the storage drives 110 may be intentionally concealed and the computing device 101 instead uses its own system unit LED(s) designed into the chassis to present the status and/or activity information of the storage drives 110. Because the system unit LEDs can all be designed and controlled in manufacturing to use the exact same LED part number, the end result is aesthetically pleasing and enhances the user experience. Regardless, if 4 or 8 storage modules from different suppliers with different hue/brightness of LED color are side-by-side, the corresponding system unit LEDs on the computing device 101 will all have matching LED hue and brightness.

Figures 2, 3:
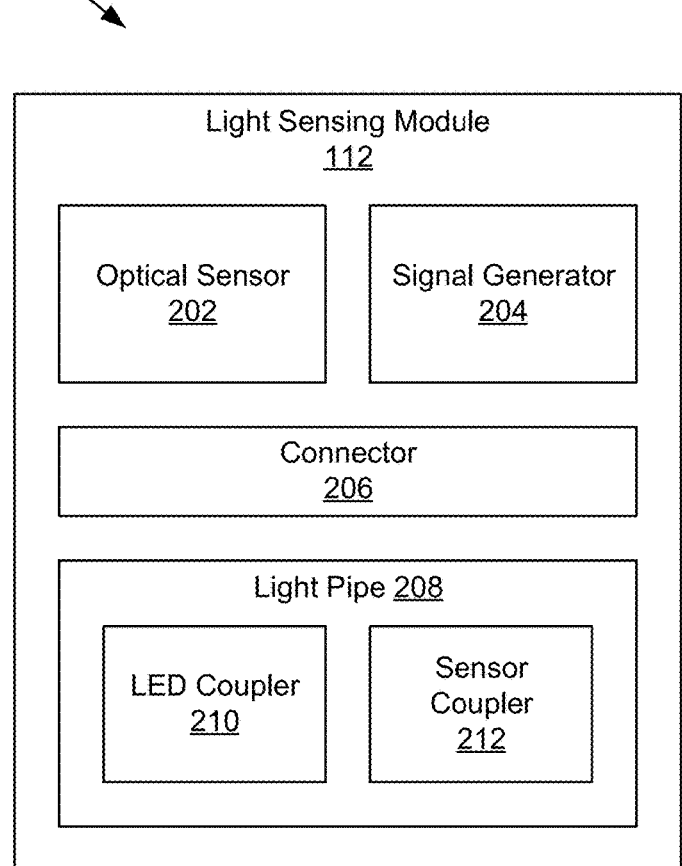
FIG. 2 illustrates one embodiment of a light sensing apparatus that supports techniques for outputting status information of an internal storage drive in accordance with aspects of the present disclosure.
FIG. 3 illustrates an E1.S emulation using a signal generating apparatus that supports techniques for outputting status information of an internal storage drive in accordance with aspects of the present disclosure.

FIG. 2 depicts an exemplary apparatus 200 for outputting status information of an internal storage drive, in accordance with aspects of the present disclosure. The apparatus 200 includes one embodiment of the light sensing module 112 that includes an optical sensor 202, a signal generator 204, a connector 206, and a light pipe 208, which are described below.

The apparatus 200 includes an optical sensor 202 configured to receive an optical signal (i.e., light signal), e.g., from an LED of a storage drive (i.e., an instance of the storage drive 110). In various embodiments, the optical sensor includes a photodetector (i.e., a photosensor) that enables the detection of visible, infrared, ultraviolet light or another form of electromagnetic radiation. In some embodiments, the optical sensor 202 includes input optics and an electric circuit configured to convert the photodetector signal into a sensor output signal. In certain embodiments, the optical sensor 202 may include one or more filters that pass through (or reject) light (or other radiation) of a specific wavelength.

In one embodiment, the optical sensor may include a plurality of photodetectors, each of which is configured to receive a different wavelength of light (or other radiation).

In some embodiments, light sensing module 112 may be configured to detect multiple wavelengths of light. For example, the light sensing module 112 may be able to detect multiple frequencies of green light. To achieve this, the optical sensor 202 may include one or more photodiode arrays configured to detect different wavelengths. In certain embodiments, the optical sensor may include an optical device that disperses the light (e.g., optical signal) from the light pipe onto different photodiodes of the photodiode array. In another embodiment, different optical filters may be located on different photodiodes, each optical filter designed to pass-through a different wavelength, so that the different wavelengths can be detected and distinguished.

In some embodiments, the optical sensor 202 may be designed to accommodate variations in the wavelength and brightness (intensity) of the integrated LEDs of various storage drives, e.g., from different device manufacturers or different batches of LEDs. In certain embodiments, the optical sensor 202 may use a photodiode that is sensitive to a relatively wide range of wavelengths, in order to account for the variations of integrated LEDs. Moreover, the detection thresholds may be adjustable to account for variations in the brightness of the integrated LEDs.

The apparatus 200 includes a signal generator 204 configured to generate a serialized electrical signal based on the optical signal received at the optical sensor 202. In various embodiments, the signal generator 204 receives—as an input—a sensor output signal from the optical sensor 202 and generates the serialized electrical signal. The signal generator 204 is discussed in greater detail below, with reference to FIG. 3.

The apparatus 200 includes a connector 206 coupled to the signal generator 204 and configured to transmit the serialized electrical signal to a controller at a system host. For example, the connector 206 may electrically couple the signal generator 204 to a controller (e.g., an instance of the status controller 116), thereby enabling the controller to receive the serialized electrical signal from the signal generator 204. In one embodiment, the controller is located at a motherboard of the system host, and the connector 206 comprises a cable that plugs into the motherboard. In one embodiment, the connector comprises a plug or connector to establish an electrical connection with the controller.

The apparatus 200 includes a light pipe 208 configured to conduct an optical signal from the LED of the storage drive to the optical sensor 202. As described above, the light pipe 208 may be a flexible part or a rigid part. The light pipe 208 provides an optical pathway between the LED(s) of the storage drive and a photodetector of the optical sensor 202. In various embodiments, the light pipe 208 may include an LED coupler 210 and/or a sensor coupler 212 configured to establish a physical/mechanical connection with an LED or photodetector and to isolate the desired optical signal from optical noise.

In some embodiments, the LED coupler 210 is configured to attach to a storage drive at a location near an LED used to signal activity information. Here, the LED coupler 210 positions the light pipe 208 near the LED. In certain embodiments, the LED coupler 210 may be part of the mounting tray that facilitates the insertion and removal of the storage drive at a storage bay of the system host.

In various embodiments, the LED coupler 210 surrounds the LED, thereby isolating the desired optical signal from optical noise. For example, the storage drive may include a green LED at one exterior location and both amber and blue LEDs (or a combination amber/blue LED) at a nearby exterior location. To isolate the desired optical signal, the LED coupler 210 may include an optical barrier, such as a divider, that separates the green LED from the amber/blue LED(s). In the following descriptions, the notation "amber/blue LED" is used with reference to the amber and blue LEDs, which may be discrete components or a combined function component.

In one embodiment, only activity associated with the green LED is desired, wherein the LED coupler 210 blocks light from the amber/blue LED(s) from reaching the light pipe 208. In another embodiment, only activity associated with the amber/blue LED(s) is desired, wherein the LED coupler 210 blocks light from the green LED from reaching the light pipe 208.

In other embodiments, the light pipe 208 may include a separate optical fiber for each and the green and amber/blue LEDs. In such embodiments, the LED coupler 210 may comprise multiple component, each configured to surround a respective LED and position a corresponding optical fiber near the respective LED.

In some embodiments, the sensor coupler 212 is configured to attach to the optical sensor 202 or to a supporting structure to which the optical sensor is mounted. Here, the sensor coupler 212 positions the light pipe 208 near the optical sensor 202. In various embodiments, the sensor coupler 212 comprises an optical barrier that blocks ambient light from reaching the optical sensor 202. In one embodiment, the sensor coupler 212 includes an optical filter that passes through (or rejects) light (or other radiation) of a specific wavelength.

In certain embodiments, the sensor coupler 212 may be part of the mounting tray that facilitates the insertion and removal of the storage drive at a storage bay of the host device. In another embodiment, the sensor coupler may be part of an adapter card used to convey data between the storage drive and a motherboard of the system host.

Note that the blocks 202-212 represent functional blocks of the apparatus 200 and may include any component or set of components that perform the functionality attributed to the component. This may include one or more physical processors which execute processor-readable instructions, the processor-readable instructions (e.g., as software application or other executable), circuitry, computer hardware, storage media, some combination of software, hardware, and/or firmware, interfaces, adapters, or any other components. The description of the functionality provided by the different components 202, 204, 206, 208, 210 and/or 212 described below is for illustrative purposes, and is not intended to be limiting, as any of components 202, 204, 206, 208, 210 and/or 212 may provide more or less functionality than is described. For example, one or more of components 202, 204, 206, 208, 210 and/or 212 may be eliminated, and some or all of its functionality may be provided by other ones of components 202, 204, 206, 208, 210 and/or 212. As another example, the apparatus 200 may comprise additional components that may perform some or all of the functionality attributed above to one or more of the components 202, 204, 206, 208, 210 and/or 212.

FIG. 3 depicts an exemplary apparatus 300 for generating a serialized electrical signal based on a received optical signal, in accordance with aspects of the present disclosure. The apparatus 300 includes one embodiment of the signal generator 204 that includes a comparator 302 and a serializer expander 304, which are described below.

The apparatus 300 includes a comparator 302 configured to receive a sensor output signal (e.g., from the optical sensor 202) and generate a comparator output based on a voltage level of the sensor output. In such embodiments, the comparator output may convert the sensor output voltage level to a stable voltage level that digitizes the sensor output.

In certain embodiments, the comparator 302 may be used to detect a wavelength associated with the received optical signal. For example, a characteristics of the sensor output (e.g., the magnitude) may be compared to various thresholds to determine the associated wavelength. In other embodiments, the comparator 302 may be used to isolate a particular wavelength within the received optical signal. For example, a characteristics of the sensor output (e.g., the magnitude) may be compared to various thresholds to filter out for multiple shades of green light.

The apparatus 300 includes a serializer expander 304 configured to generate a serialized electrical signal based on the comparator output and to provide the serialized electrical signal to an embedded controller. In some embodiments, the serializer expander 304 includes a serializer input/output expander, such as a serial general-purpose input/output (SGPIO) expander. In certain embodiments, the serializer expander 304 is coupled to the embedded controller via an I2C bus. In such embodiments, to generate the serialized electrical signal, the serializer expander 304 may be configured to serialize the comparator output over time at a sampling frequency of the I2C bus.

Note that the blocks 302 and 304 represent functional blocks of the apparatus 300 and may include any component or set of components that perform the functionality attributed to the component. This may include one or more physical processors which execute processor-readable instructions, the processor-readable instructions (e.g., as software application or other executable), circuitry, computer hardware, storage media, some combination of software, hardware, and/or firmware, interfaces, adapters, or any other components. The description of the functionality provided by the different components 302 and/or 304 described below is for illustrative purposes, and is not intended to be limiting, as any of components 302 and/or 304 may provide more or less functionality than is described. For example, one or more of components 302 and/or 304 may be eliminated, and some or all of its functionality may be provided by other ones of components 302 and/or 304. As another example, the apparatus 300 may comprise additional components that may perform some or all of the functionality attributed above to one or more of the components 302 and/or 304.

Figure 4:
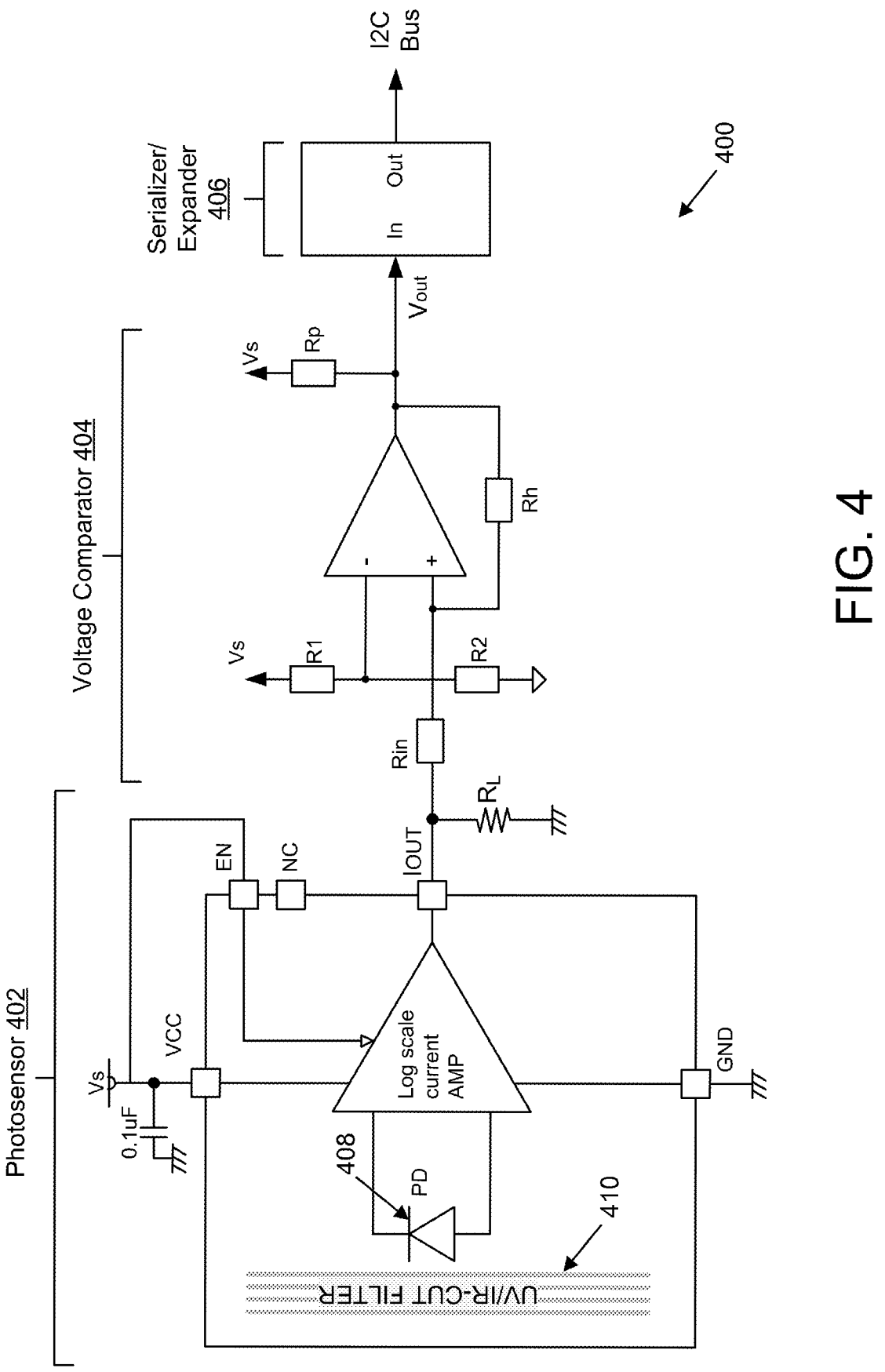
FIG. 4 illustrates one embodiment of a light sensing circuit that supports techniques for outputting status information of an internal storage drive in accordance with aspects of the present disclosure.

FIG. 4 illustrates an exemplary light sensing circuit 400, in accordance with aspects of the present disclosure. The light sensing circuit 400 includes a photosensor 402, a voltage comparator 404, and a serializer/expander 406, which are described below. In one embodiment, the photosensor 402 is a component of the optical sensor 202, the voltage comparator 404 is a component of the comparator 302, and the photosensor 402 is a component of the serializer expander 304.

In the depicted embodiment, the photosensor 402 includes at least one photodiode 408 that receives a light signal and outputs an electrical current based on the light signal. Additionally, the photosensor 402 may comprise circuitry configured to generate a sensor signal from the electrical current output by the photodiode 408. In one embodiment, the sensor signal comprises a voltage component that is based on the received light signal. In certain embodiments, the photosensor may include (or may be located adjacent to)

a cut filter 410 configured to block infrared (IR) light and/or ultraviolet (UV) light, in order to improve the quality of the light signal received at the photodiode 408.

The voltage comparator 404 receives the sensor signal from the photosensor 402 and compares the sensor signal to a known reference voltage. The output of the voltage comparator 404 changes based on whether the input voltage (i.e., the sensor signal voltage) is above or below the reference voltage. Accordingly, the voltage comparator 404 generates a comparator output that digitizes the analog sensor signal.

The serializer/expander 406 generates a serialized digital signal from the output of the voltage comparator 404. Here, the serializer/expander 406 may include a data bus interface (e.g., for a I2C bus) and may be coupled to a bus controller at the host system, such as a System Management Bus ("SMBus") controller, reads the serializer/expander 406 to retrieve digital input bits. In certain embodiments, the comparator output is multiplexed with additional signals at the serializer/expander 406. In some embodiments, the serializer/expander 406 is a SGPIO expander used to bridge drive activity functions where there are no unused signal pins available on the storage drive connector (e.g., a E1.S connector of the storage drive).

Note that a SGPIO expander is conventionally used for static and/or ad hoc data bit inputs. However, in accordance with aspects of the present disclosure, when the SMBus controller reads the SGPIO expander (i.e., serializer/expander 406) at a regular rate, this becomes a digital sampling over the serial I2C/SMBus of the digital input bits. In one embodiment, the number of digital input bits can be eight bits.

Figure 5:
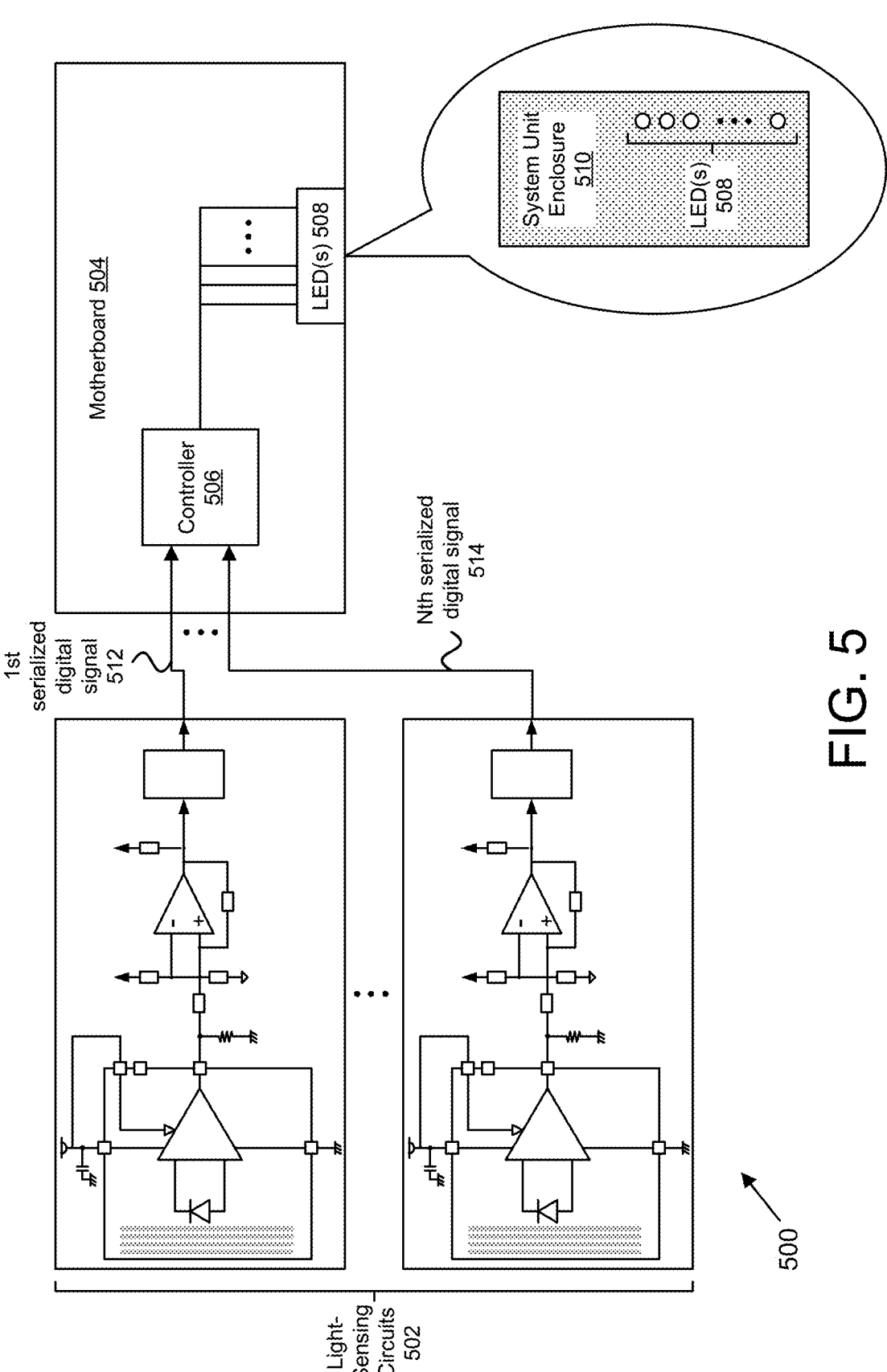
FIG. 5 illustrates one embodiment of a light-sensing system that supports techniques for outputting status information of an internal storage drive in accordance with aspects of the present disclosure.

FIG. 5 depicts an exemplary light-sensing system 500, in accordance with aspects of the present disclosure. The light-sensing system 500 includes a plurality of light sensing circuits 502 and a motherboard 504, e.g., of a system unit. The plurality of light-sensing circuits 502 are communicatively coupled to a controller 506 located at the motherboard 504. In turn, the controller 506 is communicatively coupled with one or more system unit LEDs 508. In certain embodiments, the one or more system unit LEDs 508 may be located on the motherboard 504. In such embodiments, the one or more system unit LEDs 508 may be positioned on the motherboard 504 such that the LED(s) 508 are visible at a system chassis 510 that contains the motherboard 504. For example, the system chassis 510 may include a window or opening (or similar) through which the LED(s) 508 are visible. In other embodiments, the one or more system unit LEDs 508 are located at or near an exterior surface of the system chassis 510.

Each of the light sensing circuits 502 may be an instance of the light sensing circuit 400, i.e., containing at least a photosensor, a voltage comparator, and a serializer/expander, as described above. The light sensing circuits 502 are configured to each generate a serialized electrical signal based on light signals from a respective storage drive, where each serialized electrical signal indicates status and/or activity information of the respective storage drive. As described above, to generate a respective serialized electrical signal, each light sensing circuit 502 may be configured to receive a respective sensor output from a photosensor, creating a respective comparator output based on the sensor output, and creating the respective serialized electrical signal based on the comparator output.

In certain embodiments, the system unit contains multiple storage drives and there is a one-to-one correspondence of storage drives to light sensing circuits 502. In certain embodiments, the system unit contains one or more storage drives, and each storage drive includes multiple drive LEDs used to indicate its status and/or activity information. In such embodiments, there may be a one-to-one correspondence of drive LEDs to light sensing circuits 502. In other embodiments, there may be a one-to-one correspondence of storage drives to light sensing circuits 502, with each light sensing circuit multiplexing status and/or activity signaling from multiple drive LEDs of the same storage drive.

The controller 506 is configured to receive a plurality of serialized electrical signals from the plurality of light sensing circuits 502. In the depicted embodiment, the light-sensing system 500 includes N light sensing circuits 502 and the controller receives a first serialized digital signal 512 from the first of the plurality of light sensing circuits 502, up to an Nth serialized digital signal 514 from the Nth of the light sensing circuits 502. In some embodiments, the controller 506 is configured to receive the respective serializer electrical signals via an I2C bus. In such embodiments, the controller 506 may be configured to sample the I2C bus at a particular sampling frequency, where the light sensing circuits 502 serialize the comparator outputs over time at a sampling frequency of the I2C bus.

Moreover, the controller 506 is configured to generate status/activity information (i.e., indicative of status and/or activity of the storage drives) based at least in part on the respective serialized electrical signals. In some embodiments, to generate the status/activity information, the controller 506 is configured to de-serialize each of the plurality of serialized electrical signals. For example, the controller 506 may de-serialize each I2C stream associated with a different E1.S module. In various embodiments, the status/activity information includes one or more of: A) an activity signal; B) a no-activity signal; C) a logging activity; D) a virtual LED signal; E) or a combination thereof. In some embodiments, the controller 506 is an embedded controller of the motherboard 504.

The controller 506 may be configured to output the generated status/activity information via the one or more system unit LEDs 508. In certain embodiments, the light sensing system 500 include a single system unit LED 508 for indicating activities of multiple storage drives. In such embodiments, to output the status/activity information, the controller 506 may be configured to combine status/activity information of the multiple storage drives. In other embodiments, the light sensing system 500 may include multiple system unit LEDs 508, where there is a 1-to-1 mapping between system unit LEDs 508 and storage drives. In yet other embodiments, the light sensing system 500 may include multiple system unit LEDs 508, but fewer system unit LEDs 508 than storage drives, such that for at least a subset of the system unit LEDs 508 there is a 1-to-multiple mapping of system unit LEDs 508 to storage drives.

While the depicted light sensing system 500 includes one or more system unit LEDs 508, in other embodiments the one or more system unit LEDs 508 may be replaced with an LCD screen on the exterior surface of the system chassis 510. In such embodiments, the controller 506 may be configured to present a text representation of the status information on the LCD screen. In other such embodiments, the controller 506 may be configured to present a virtual LED representation of the status information on the LCD screen.

Figure 6:
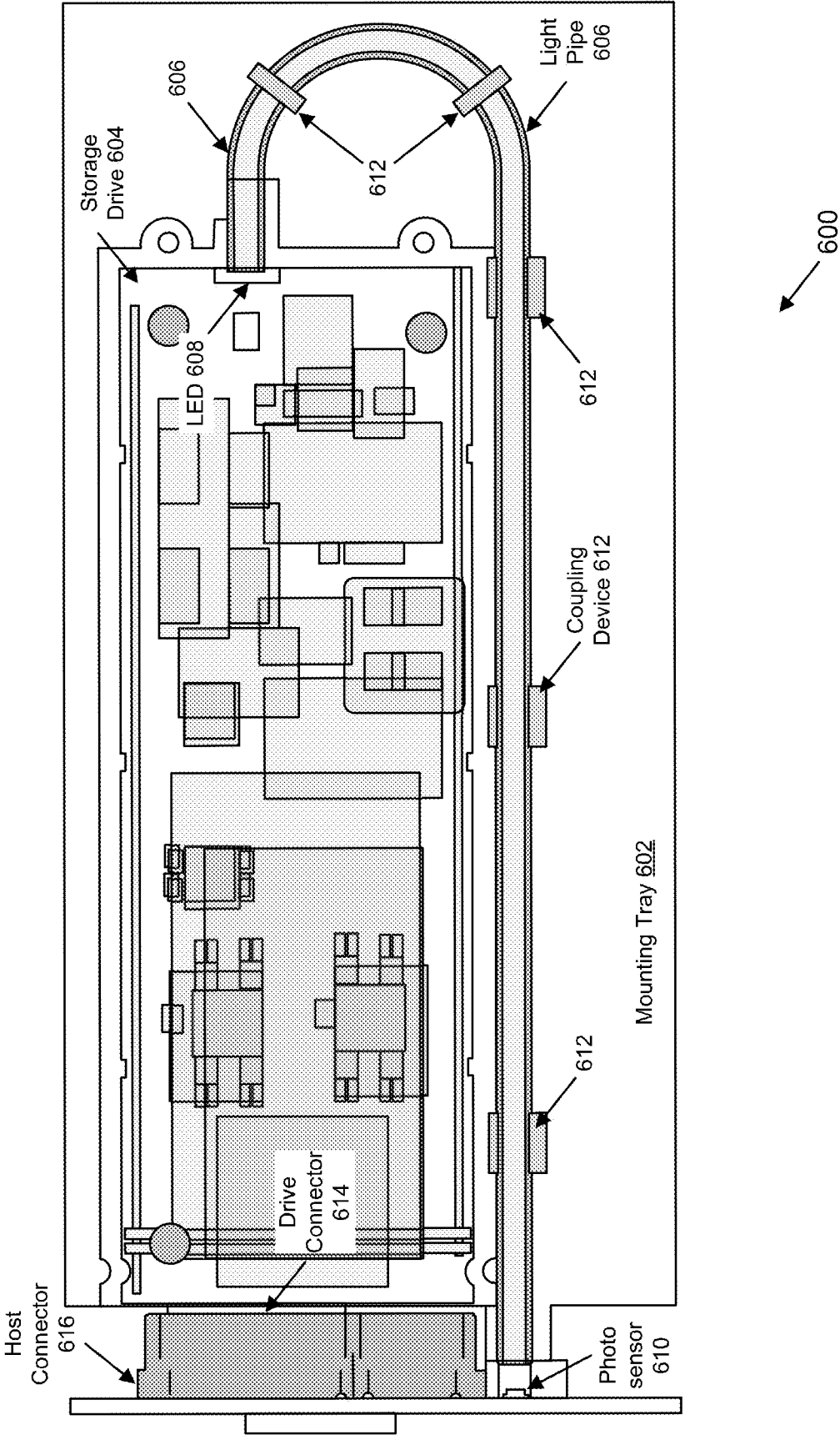
FIG. 6 illustrates one embodiment of an arrangement of a mounting tray, storage drive and light pipe that support techniques for outputting status information of an internal storage drive in accordance with aspects of the present disclosure.

FIG. 6 depicts an exemplary arrangement 600 of a mounting tray 602, storage drive 604, and light pipe 606, in accordance with aspects of the present disclosure. In the depicted embodiment, the storage drive 604 includes an LED 608 and the light pipe 606 is arranged with one end adjacent to the LED. In certain embodiments, the light pipe 606 and/or the mounting tray 602 may include a coupler that connects the adjacent end of the light pipe 606 to the LED 608. The opposite end of the light pipe 606 is arranged to be adjacent to a photosensor 610. In certain embodiments, the light pipe 606 and/or the mounting tray 602 may include a coupler that connects this end of the light pipe 606 to the photosensor 610. Moreover, the mounting tray 602 may include one or more coupling devices 612 that affix the light pipe 606 to the mounting tray 602.

In the depicted embodiment, the photosensor 610 is not in light-of-sight with the LED 608. In one embodiment, one or more components of the storage drive 604, an enclosure of the storage drive 604, a component of the mounting tray 602, and/or another object may block or obscure the line-of-sight path between the LED 608 and the photosensor 610. In another embodiment, the LED 608 may be oriented away from the photosensor 610. The light pipe 606 provides a protected optical path between the LED 608 and the photosensor 610, thereby allowing an optical signal emitted by the LED 608 to be detected by the photosensor 610. In one embodiment, the photosensor 610 includes signal conditioning circuits for deriving a digital output (e.g., serialized electrical signal) from the optical signal emitted by the LED 608.

As depicted, the storage drive 604 may include a drive connector 614 for communicating data between the storage drive 604 and the host system. Here, the drive connector 614 may be coupled to a host connector 616. In certain embodiments, the host connector 616 provides mechanical support and electrical connections linking the storage drive 604 to a motherboard of the host system. As an example, the drive connector 614 may be an edge connector complying with an EDSFF specification, such as the E1.S standard, and the host connector 616 be a corresponding socket connector that also complies with the EDSFF specification. While the E1.S connector is an example of a form factor of the connector to be used with the storage drive, in other examples, the connector form factor may comply with the E1.L form factor, the M.2 form factor, the E3.S form factor, the E3.L form factor, the mSATA form factor, or the like.

In certain embodiments, the storage drive 604 attaches directly to the motherboard of the host system via the drive connector 614. In other embodiments, the storage drive 604 connects to the motherboard via a backplane card or adapter card. In such embodiments, the host connector 616 may form a part of the backplane card or adapter card, and the mounting tray 602 may attach to—or be coupled with—the backplane card or adapter card. Moreover, in some embodiments, the photosensor 610 may be located at the motherboard, or may be a part of the backplane card or adapter card. In another embodiment, the photosensor 610 may be located on the mounting tray 602. While not depicted in FIG. 6, in certain embodiment a sensor cable is used to connect the photosensor 610 to the motherboard.

FIGS. 7A and 7B provide a detailed view of a first end of the light pipe 606 that is located near the LED 608, in accordance with aspects of the disclosure. FIG. 7A depicts a detailed view of an arrangement 700 of a first coupling member 702 located at the first end of the light pipe 606.

FIG. 7B depicts a cut-away view 704 of the light pipe 606 and the first coupling member 702. The first coupling member 702 surrounds the LED 608 and is located at the first end of the light pipe 606 near the LED 608. Also depicted in the optical path 706 provided by the light pipe 606, leading from the LED 608 to the photosensor 610 (not depicted in FIG. 7B).

The first coupling member 702 isolates the optical signal produced by the LED 608. In the depicted example, the storage drive 604 may be an E1.S module having multiple signaling LED, including a green LED on the backside of the E1.S module and an amber/blue LED on the topside of the E1.S module. In certain embodiments, the first coupling member 702 includes a divider that separates the green LED from the amber/blue LED of the storage drive 604, thereby isolating a particular optical signal. In some embodiments, the first coupling member 702 blocks ambient light and/or unwanted LED optical signal from reaching the first end of the light pipe 606.

FIG. 8 depicts a detailed perspective view of an arrangement 800 of a second end of the light pipe 606 that is located near the photosensor, in accordance with aspects of the disclosure. A second coupling member 802 aligns the second end of the light pipe 606 with the at least one photosensor, such that the second coupling member 802 prevents ambient light from reaching the photosensor. In certain embodiments, the second coupling member comprises an opaque plastic collar that holds the second end of the light pipe 606 and blocks ambient light from reaching the photosensor. In the depicted embodiment, the second coupling member 802 is a part of the mounting tray 602. However, in other embodiments, the second coupling member 802 may be a part of the light pipe and/or a part of a backplane card or adapter card onto which the photosensor is located. Note that locating the light pipe 606 on the mounting tray 602 allows maintaining the "blind mate" ability of the storage drive 604 (e.g., an E1.S module) for inserting and removing the drive the backplane card or adapter card.

Figure 9:
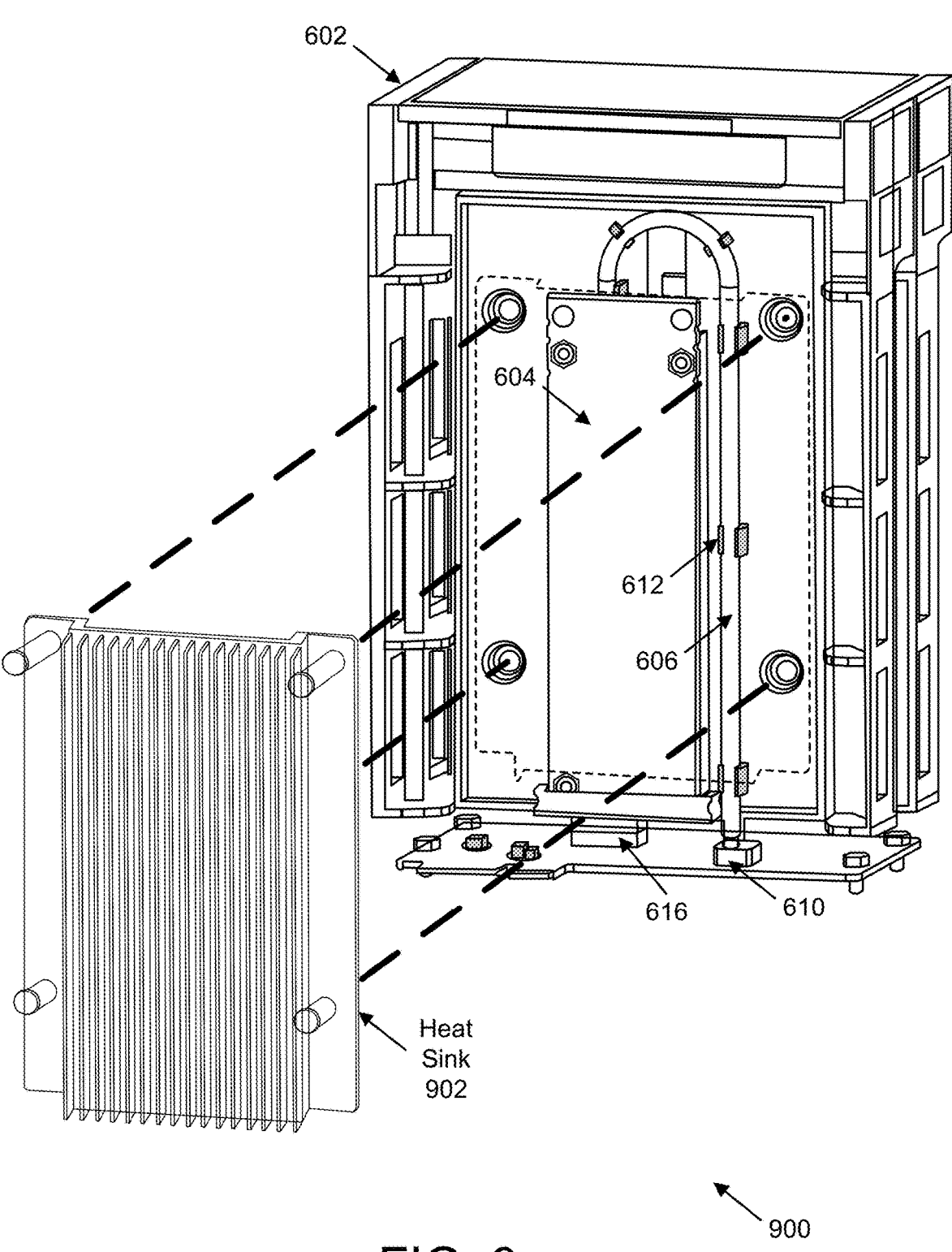
FIG. 9 illustrates another perspective view of the arrangement of FIG. 6 in accordance with aspects of the present disclosure.

FIG. 9 depicts a perspective view of an arrangement 900 of the mounting tray 602 onto which the storage drive 604 is mounted. In various embodiments, the mounting tray 602 may be configured to receive a heat sink 902 that couples to the storage drive 604 and provides heat mitigation for the storage drive 604. In the depicted embodiment, the heat sink 902 may cover the light pipe 606, such that the light pipe 606 is adjacent to the storage drive 604 and in an interior space formed by the heat sink 902 relative to the mounting tray 602. Beneficially, the arrangement 900 allows for a relatively shorter light pipe 606 and allows the photosensor 610 to be located relatively nearer to the host connector 616.

Figure 10:
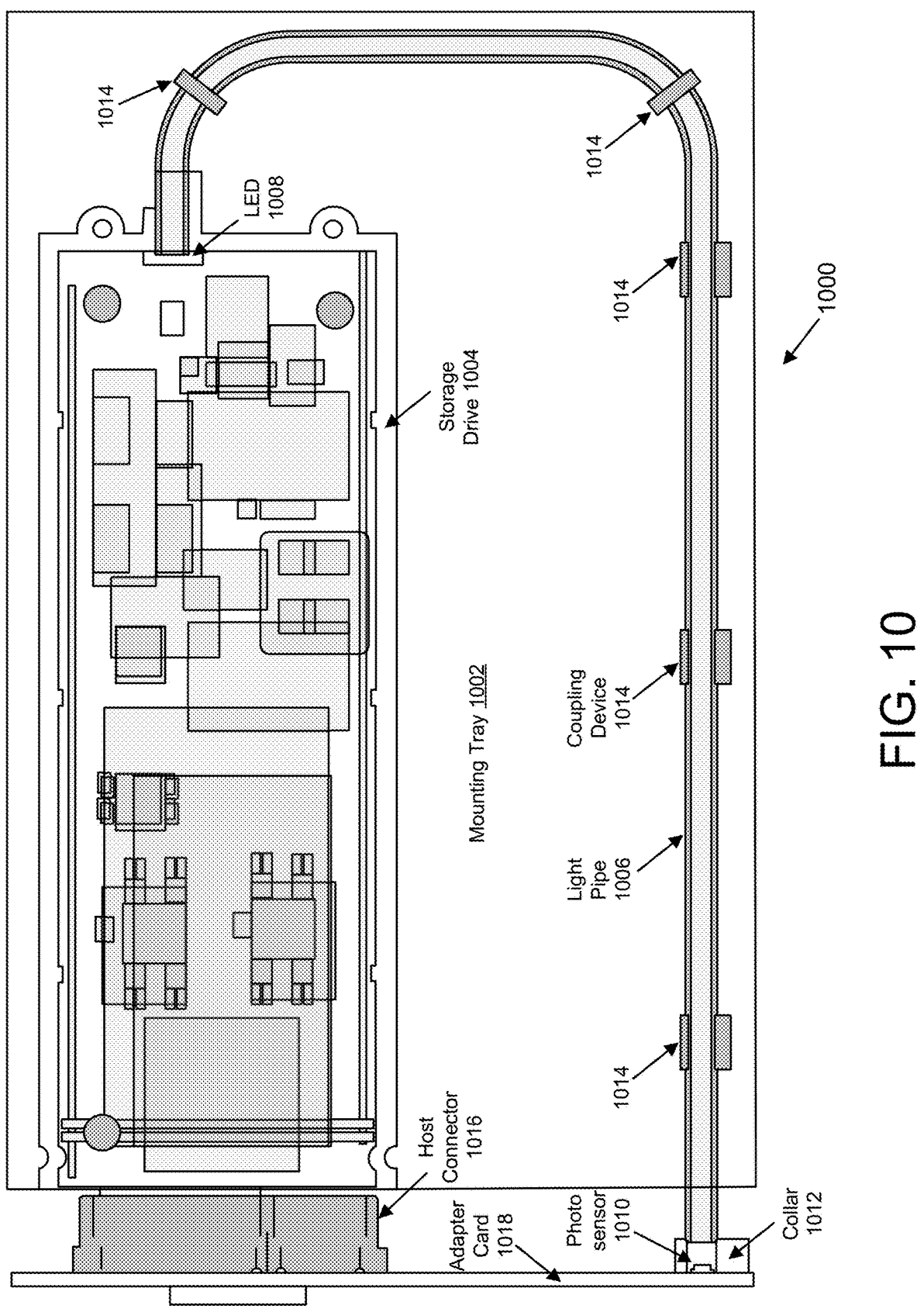
FIG. 10 illustrates one embodiment of an arrangement of a mounting tray, storage drive and light pipe that support techniques for outputting status information of an internal storage drive in accordance with aspects of the present disclosure.

FIG. 10 depicts an alternative arrangement 1000 of a mounting tray 1002, a storage drive 1004, and a light pipe 1006, in accordance with aspects of the present disclosure. In the depicted embodiment, the storage drive 1004 includes an LED 1008 and the light pipe 1006 is arranged with one end adjacent to the LED 1008. In the depicted embodiment, the photosensor 1010 is not in light-of-sight with the LED 1008. The light pipe 1006 provides a protected optical path between the LED 1008 and the photosensor 1010, thereby allowing an optical signal emitted by the LED 1008 to be detected by the photosensor 1010.

In certain embodiments, the light pipe 1006 and/or the mounting tray 1002 may include a coupler that connects the adjacent end (i.e., first end) of the light pipe 1006 to the LED 1008. The opposite end (i.e., second end) of the light pipe 1006 is arranged to be adjacent to a photosensor 1010. In certain embodiments, the mounting tray 1002 may include one or more coupling devices 1014 that affix the light pipe 1006 to the mounting tray 1002.

The storage drive 1004 may be coupled to a host connector 1016. In certain embodiments, the host connector 1016 provides mechanical support and electrical connections linking the storage drive 1004 to an adapter card 1018. The adapter card 1018 provides an interface between the storage drive 604 and the motherboard of the host system, e.g., using a high speed data cable. In the depicted embodiment, the photosensor 1010 and a collar 1012 are located on the adapter card 1018, wherein the collar 1012 connects the second end of the light pipe 1006 to the photosensor 1010.

Figure 11:
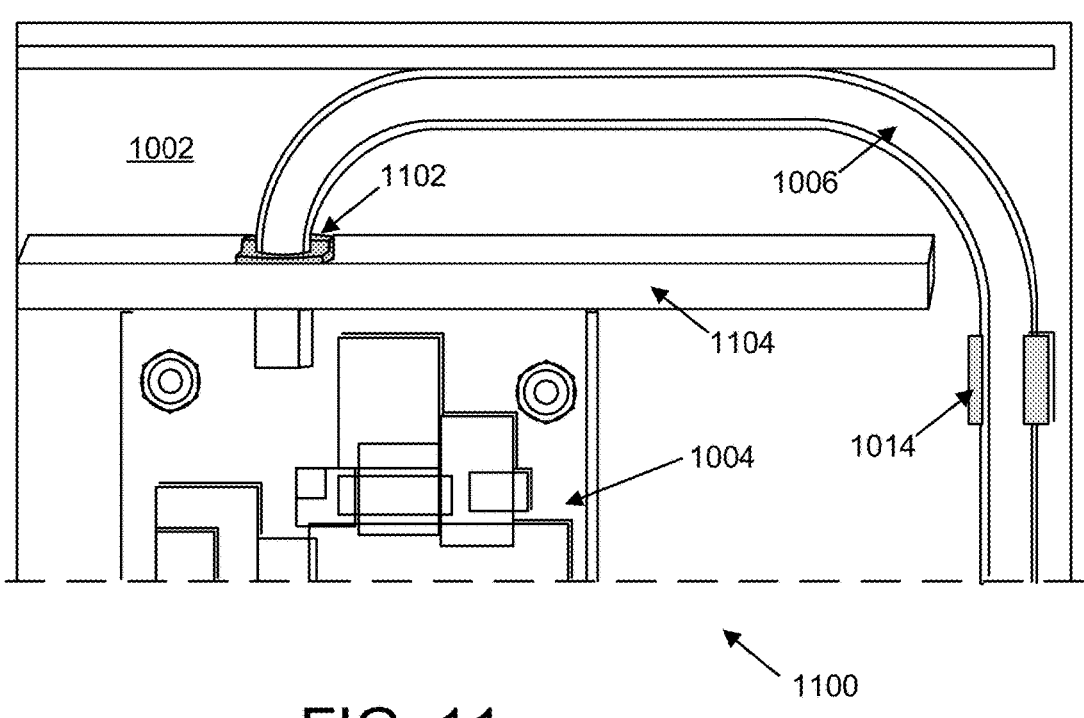
FIG. 11 illustrates a detailed view of the arrangement of FIG. 10 in accordance with aspects of the present disclosure.

FIG. 11 depicts a detailed view of an arrangement 1100 of a first end of the light pipe 1006 that is located near the LED 1008, in accordance with aspects of the disclosure. A first coupling member 1102 is located at the first end of the light pipe 1006 and aligns the first end of the light pipe 1006 with the at least one photosensor, such that the first coupling member 1102 prevents ambient light from reaching the photosensor. In certain embodiments, the first coupling member 1102 is composed of an optically opaque material that surrounds the LED 1008. In certain embodiments, the first coupling member 1102 is part of a mounting member 1104 used to attach the storage drive 1004 to the mounting tray 1002.

The first coupling member 1102 isolates the optical signal produced by the LED 1008. In the depicted example, the storage drive 1004 may be an E1.S module having multiple signaling LED, wherein the first coupling member 1102 may include a divider that separates the green LED from the amber/blue LED of the storage drive 1004, thereby isolating a particular optical signal. In some embodiments, the first coupling member 1102 blocks ambient light and/or unwanted LED optical signal from reaching the first end of the light pipe 1006.

Figure 12:
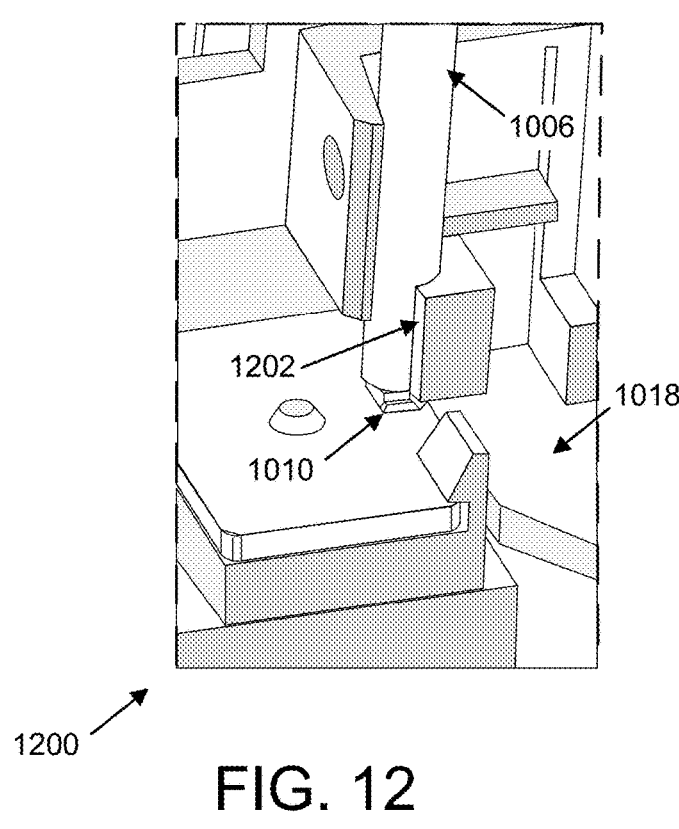
FIG. 12 illustrates a perspective view of the arrangement of FIG. 10 in accordance with aspects of the present disclosure.

FIG. 12 depicts a detailed perspective view of an arrangement 1200 of a second end of the light pipe 1006 that is located near the photosensor 1010, in accordance with aspects of the disclosure. A second coupling member 1202 aligns the second end of the light pipe 1006 with the at least one photosensor 1010. In certain embodiments, the second coupling member comprises a plastic collar that holds the second end of the light pipe 1006. Although not depicted in FIG. 12, in certain embodiments the second coupling member 1202 may be composed of opaque material that surrounds the second end of the light pipe 1006 and blocks ambient light from reaching the photosensor 1010. In the depicted embodiment, the second coupling member 1202 is a part of the adapter card 1018 onto which the photosensor 1010 is located. However, in other embodiments, the second coupling member 1202 may be a part of the mounting tray 1002.

Figure 13:
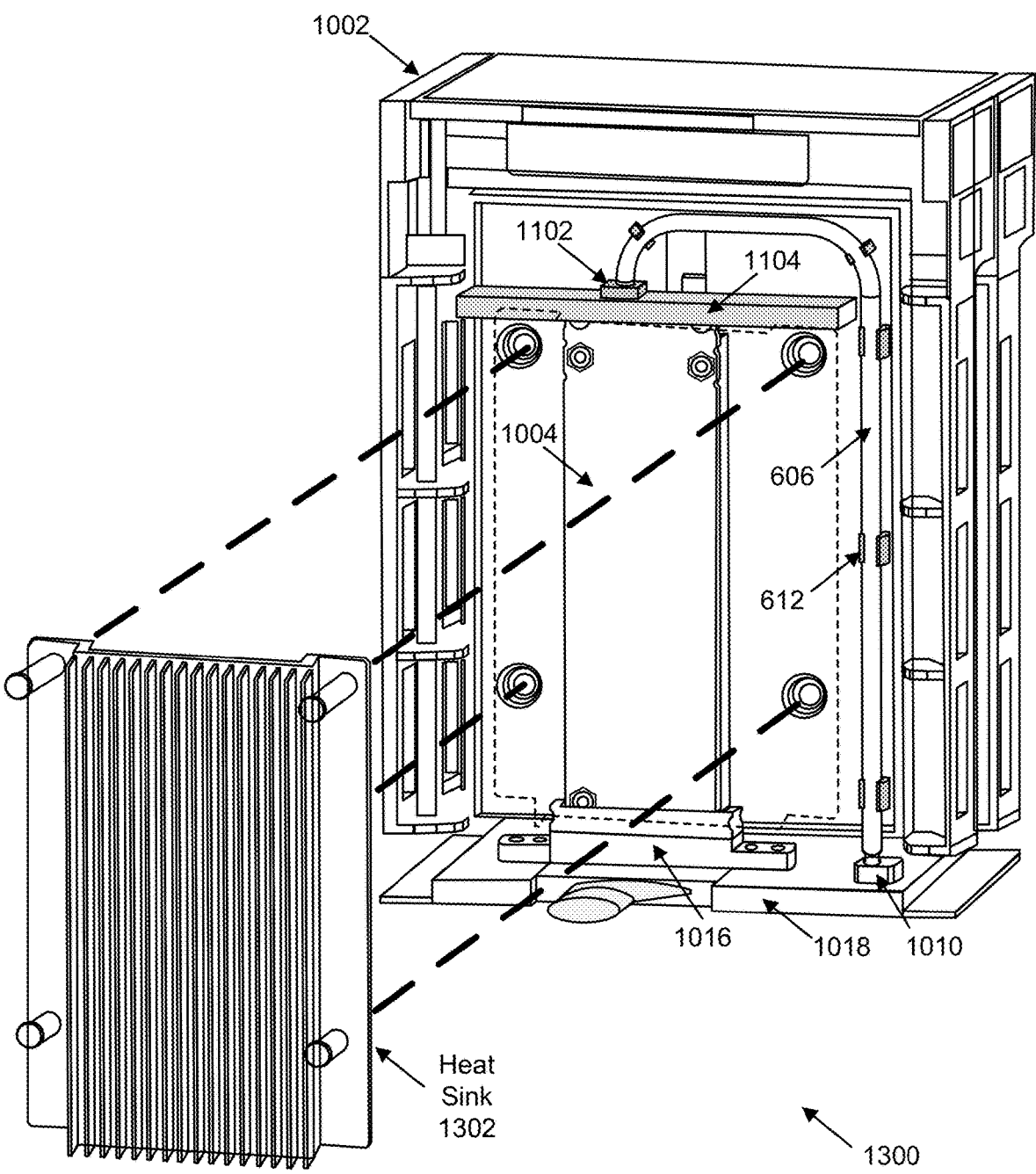
FIG. 13 illustrates another perspective view of the arrangement of FIG. 10 in accordance with aspects of the present disclosure.

FIG. 13 depicts a perspective view of an arrangement 1300 of the mounting tray 1002 onto which the storage drive 1004 is mounted. In various embodiments, the mounting tray 1002 may be configured to receive a heat sink 1302 that couples to the storage drive 1004 and provides heat mitigation for the storage drive 1004. In the depicted embodiment, the light pipe 1006 may be located adjacent to the heat sink 1302 and exterior to the space formed by the heat sink 1302 relative to the mounting tray 1002. Beneficially, the arrangement 1300 allows for a light pipe 1006 to be made from less heat resistive material.

Figure 14:
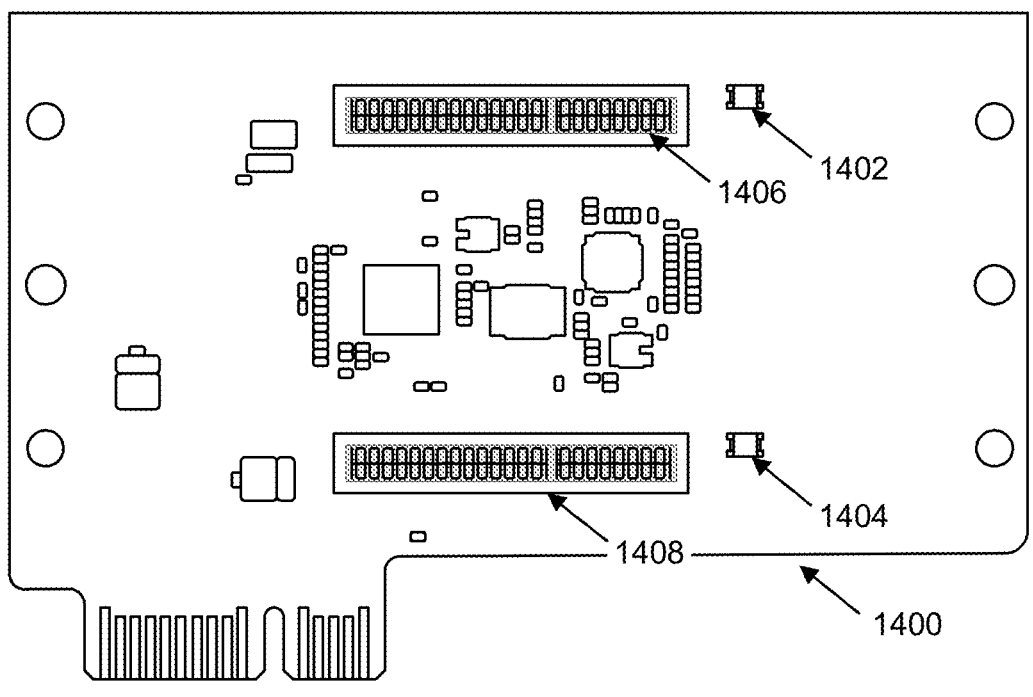
FIG. 14 illustrates one embodiment of a backplane card that supports techniques for outputting status information of an internal storage drive in accordance with aspects of the present disclosure.

FIG. 14 depicts a backplane card 1400 with light sensing circuitry, in accordance with aspects of the present disclosure. The backplane card 1400 may include a first photosensor 1402 for receiving one or more optical signals from a first storage drive. Additionally, the backplane card 1400 may include a second photosensor 1404 for receiving one or more optical signals from a second storage drive. The first storage drive may connect to the backplane card 1400 via a first slot connector 1406, while the second storage drive may connect to the backplane card 1400 via a second slot connector 1408. Here, the first slot connector 1406 and the second slot connector 1408 may be embodiments of the host connector 616.

Figure 15:
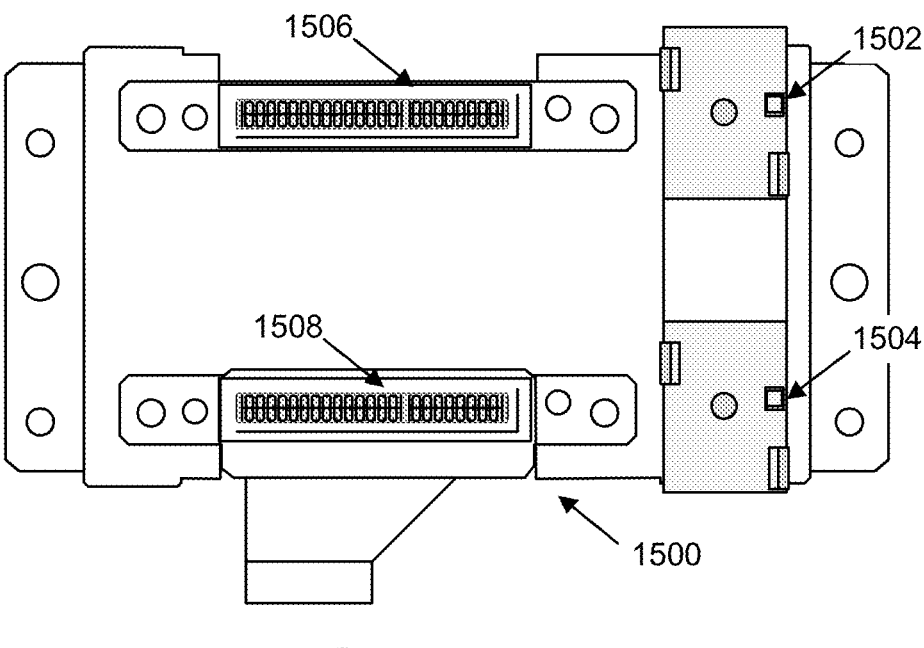
FIG. 15 illustrates one embodiment of an adapter card that supports techniques for outputting status information of an internal storage drive in accordance with aspects of the present disclosure.

FIG. 15 depicts an adapter card 1500 with light sensing circuitry, in accordance with aspects of the present disclosure. The adapter card 1500 may include a first photosensor 1502 for receiving one or more optical signals from a first storage drive. Additionally, the adapter card 1500 may include a second photosensor 1504 for receiving one or more optical signals from a second storage drive. The first storage drive may connect to the adapter card 1500 via a first slot connector 1506, while the second storage drive may connect to the adapter card 1500 via a second slot connector 1508. Here, the first slot connector 1506 and the second slot connector 1508 may be embodiments of the host connector 1016.

FIG. 16 depicts an exemplary method 1600 for collating and selectively presenting communications, in accordance with aspects of the present disclosure. In various embodiments, the method 1600 is performed by a light sensing device, such as the computing device 101, the light sensing module 112, or the like, as described above. In some embodiments, all or a portion of the method 1600 is performed by a processor, such as a microcontroller, a microprocessor, a Central Processing Unit ("CPU"), a Graphics Processing Unit ("GPU"), an auxiliary processing unit, a FPGA, or the like.

The method 1600 begins and generates 1602, at each of a plurality of light sensing modules, a serialized electrical signal based on light signals from a storage drive, where the serialized electrical signal indicates activity of the storage drive. In various embodiments, means for generating 1602 the serialized electrical signal may include the light sensing module 112, the apparatus 200, the signal generator 204, the apparatus 300, the serializer expander 304, the light sensing circuit 400, the serializer/expander 406, the light-sensing circuits 502, or the like.

The method 1600 includes receiving 1604, at a controller, the respective serialized electrical signals from each light sensing module. In some embodiments, each serialized electrical signal indicates activity information of a corresponding storage drive. In various embodiments, means for receiving 1604 the respective serialized electrical signals may include the status controller, the controller 506, or the like.

The method 1600 includes generating 1606 status information based on the respective serialized electrical signals. In some embodiments, generating 1606 the status information includes de-serializing each respective serialized electrical signal at an embedded controller. In some embodiments, generating 1606 the status information includes combining activity information of multiple storage drives. In various embodiments, the status information includes one or more of: an activity signal; a no-activity signal; a logging activity; a virtual LED signal; or a combination thereof. In various embodiments, means for generating 1606 the status information may include the status controller, the controller 506, or the like.

The method 1600 includes outputting 1608 the status information via a display element. In some embodiments, the display element comprises an LCD screen. In one embodiment, outputting 1608 the status information includes presenting a text representation. In another embodiment, outputting 1608 the status information includes presenting a virtual LED representation of the status information on the LCD screen. In various embodiments, means for outputting 1608 the status information via the display element may include the status controller, the controller 506, or the like. The method 1600 ends.

Figure 17:
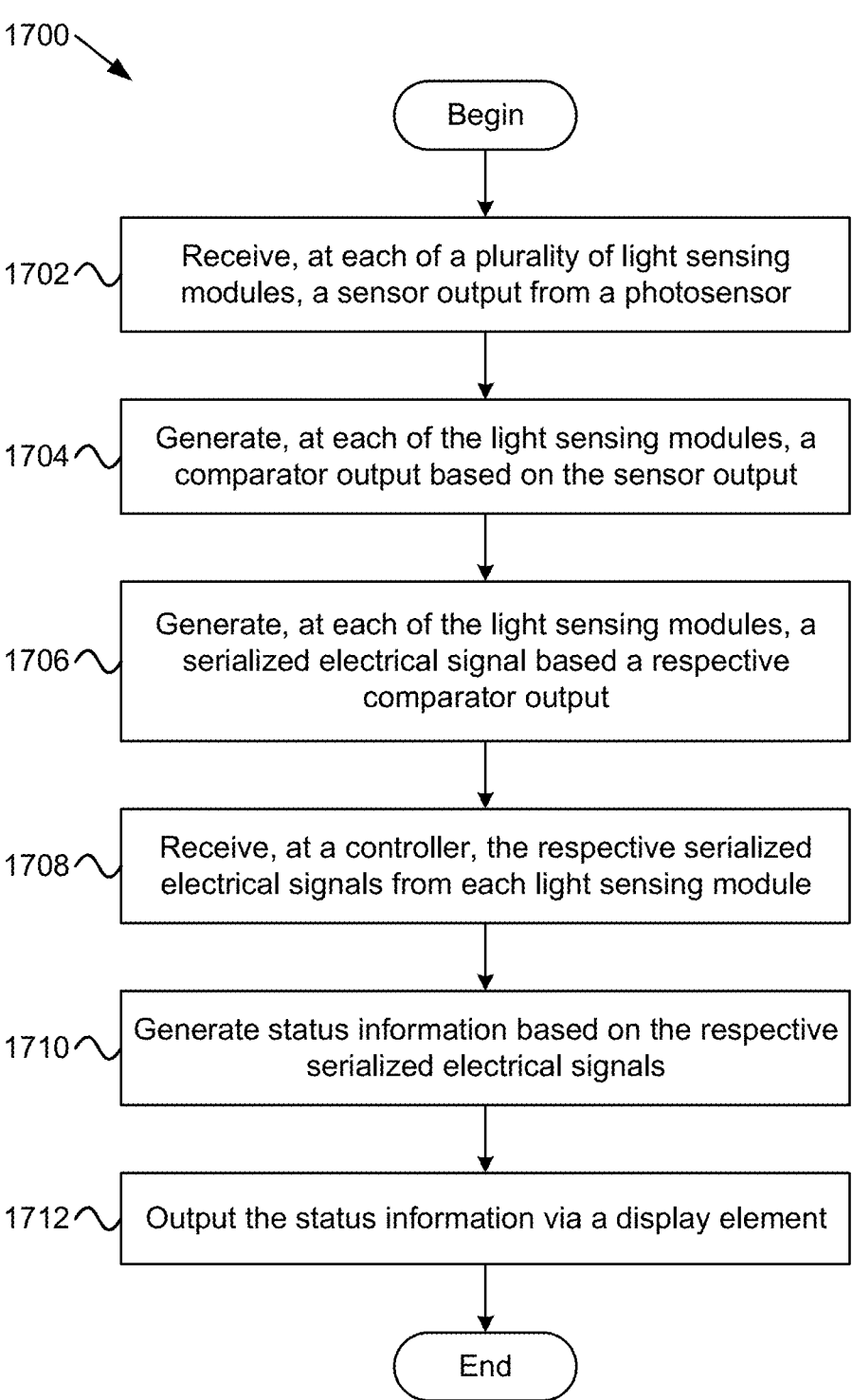
FIG. 17 illustrates one embodiment of another method for outputting status information of an internal storage drive in accordance with aspects of the present disclosure.

FIG. 17 depicts one embodiment of a method 1700 for outputting status information of an internal storage drive, in accordance with aspects of the present disclosure. In various embodiments, the method 1700 is performed by a light sensing device, such as the computing device 101, the light sensing module 112, or the like, as described above. In some embodiments, the method 1700 is performed by a processor, such as a microcontroller, a microprocessor, a CPU, a GPU, an auxiliary processing unit, a FPGA, or the like.

The method 1700 begins and receives 1702, at each of a plurality of light sensing modules, a sensor output from a photosensor. In some embodiments, the photosensor is optically coupled to a LED of a storage drive, such that the sensor output indicates activity information of the LED of the storage drive. In various embodiments, means for receiving 1702 the serialized electrical signal may include the light sensing module 112, the apparatus 200, the optical sensor 202, the light sensing circuit 400, the photosensor 402, the light-sensing circuits 502, or the like.

The method 1700 includes generating 1704, at each of a plurality of light sensing modules, a comparator output based on the sensor output. In some embodiments, the comparator output comprises a stable voltage level that digitizes the sensor output. In various embodiments, means for generating 1704 the comparator output may include the light sensing module 112, the apparatus 200, the signal generator 204, the apparatus 300, the comparator 302, the light sensing circuit 400, the voltage comparator 404, the light-sensing circuits 502, or the like.

The method 1700 includes generating 1706, at each of a plurality of light sensing modules, a serialized electrical signal based on a respective comparator output. In some embodiments, a serializer input/output expander generates 1706 the serialized electrical signal. In certain embodiments, the serializer input/output expander is coupled to the controller via an I2C bus. In various embodiments, means for generating 1706 the serialized electrical signal may include the light sensing module 112, the apparatus 200, the signal generator 204, the apparatus 300, the serializer expander 304, the light sensing circuit 400, the serializer/expander 406, the light-sensing circuits 502, or the like.

The method 1700 includes receiving 1708, at a controller, the respective serialized electrical signals from each light sensing module. In some embodiments, the controller is coupled to the serializer input/output expander via an I2C bus, the serializer input/output expander may be configured to serialize the comparator output over time at a sampling frequency of the I2C bus. In various embodiments, means for receiving 1708 the respective serialized electrical signals may include the status controller, the controller 506, or the like.

The method 1700 includes generating 1710 status information based on the respective serialized electrical signals. In some embodiments, generating 1710 the status information includes de-serializing each respective serialized electrical signal at an embedded controller. In some embodiments, generating 1710 the status information includes combining activity information of multiple storage drives. In various embodiments, means for generating 1710 the status information may include the status controller, the controller 506, or the like.

The method 1700 includes outputting 1712 the status information via a display element. In various embodiments, the status information includes one or more of: an activity signal; a no-activity signal; a logging activity; a virtual LED signal; or a combination thereof. In various embodiments, means for outputting 1712 the status information via the display element may include the status controller, the controller 506, or the like.

In some embodiments, the display element comprises an LCD screen. In one embodiment, outputting 1712 the status information includes presenting a text representation. In another embodiment, outputting 1712 the status information includes presenting a virtual LED representation of the status information on the LCD screen. In other embodiments, the display element comprises a system-unit LED indicating activities of a plurality of storage drives. The method 1700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a mounting tray configured to hold a storage drive;
   a light pipe coupled to a light-emitting diode (LED) of the storage drive; and
   a light sensing module coupled to the light pipe and configured to:
      receive a light signal from the LED,
      generate a serialized electrical signal based on the light signal, and
      output the serialized electrical signal to a bus controller, wherein the serialized electrical signal indicates status information of the storage drive,
   wherein the light pipe is affixed to the mounting tray and comprises a first coupling member located at a first end of the light pipe, wherein the first coupling member surrounds the LED and isolates the light signal, and
   wherein the mounting tray comprises a second coupling member that aligns a second end of the light pipe with the light sensing module, wherein the second coupling member prevents ambient light from reaching the light sensing module.

2. The apparatus of claim 1,
   wherein the light sensing module comprises at least one photosensor, and
   wherein the light pipe comprises an optical fiber.

3. The apparatus of claim 1, wherein the apparatus further comprises an end panel coupled to the mounting tray, the end panel comprising:
   a socket connector coupled to the storage drive and configured to exchange electrical signals between the storage drive and a system host;
   a receptacle configured to hold the light sensing module; and
   a connector coupled with the light sensing module and the system host, wherein the bus controller is located at the system host, and wherein the connector is configured to relay the serialized electrical signal.

4. The apparatus of claim 1, wherein the apparatus further comprises a heatsink located adjacent to and coupled with the storage drive, and wherein the light pipe is located adjacent to the storage drive and between the heatsink and the mounting tray.

5. The apparatus of claim 1, wherein the light sensing module comprises:

a photosensor;

a voltage comparator configured to:

receive a sensor output from the photosensor, and generate a comparator output based on the sensor output, wherein the comparator output comprises a stable voltage level that digitizes the sensor output; and a serializer input/output expander that generates the serialized electrical signal based on the comparator output.

6. The apparatus of claim 5, wherein the serializer input/output expander is coupled to the bus controller via an Inter-Integrated Circuit (I2C) bus.

7. The apparatus of claim 6, wherein to generate the serialized electrical signal, the serializer input/output expander is configured to serialize the comparator output over time at a sampling frequency of the I2C bus.

8. A system comprising:

at least one drive unit, each drive unit comprising:

a mounting tray configured to hold a storage drive;

a light pipe coupled to a light-emitting diode (LED) of the storage drive; and a light sensing module coupled to the light pipe and configured to:

receive a light signal from the LED, and generate a serialized electrical signal based on the light signal, wherein the serialized electrical signal indicates activity of the storage drive, wherein the light pipe is affixed to the mounting tray and comprises a first coupling member located at a first end of the light pipe, wherein the first coupling member surrounds the LED and isolates the light signal, and wherein the mounting tray comprises a second coupling member that aligns a second end of the light pipe with the light sensing module, wherein the second coupling member prevents ambient light from reaching the light sensing module;

a display element; and a controller communicatively coupled to at least one light sensing module and configured to:

receive a respective serialized electrical signal from each light sensing module;

generate status information based on the respective serialized electrical signals; and output the status information via the display element.

9. The system of claim 8, wherein to generate the status information, the controller is configured to de-serialize each respective serialized electrical signal, wherein the status information comprises one or more of:

an activity signal;

a no-activity signal;

a logging activity;

a virtual LED signal;

or a combination thereof.

10. The system of claim 8, wherein the display element comprises a liquid crystal display (LCD) screen, and wherein to output the status information, the controller presents a text representation of the status information on the LCD screen.

11. The system of claim 8, wherein the display element comprises a liquid crystal display (LCD) screen, and wherein to output the status information, the controller presents a virtual LED representation of the status information on the LCD screen.

12. The system of claim 8, wherein to generate the status information, the controller is configured to combine activity information of multiple storage drives, and wherein the display element comprises a system unit LED indicating activities of a plurality of storage drives.

13. The system of claim 8, wherein the light sensing module comprises at least one photosensor, and wherein the light pipe comprises an optical fiber.

14. The system of claim 8, further comprising a backplane card panel comprising:

the light sensing module;

a socket connector coupled to the storage drive; and an edge connector coupled with the light sensing module and a system host, wherein the controller is located at the system host, and wherein the connector is configured to relay the serialized electrical signal to the system host and to further relay electrical signals between the storage drive and the system host.

15. The system of claim 8, wherein the light sensing module comprises:

a photosensor;

a voltage comparator configured to:

receive a sensor output from the photosensor, and generate a comparator output based on the sensor output, wherein the comparator output comprises a stable voltage level that digitizes the sensor output; and a serializer input/output expander that generates the serialized electrical signal based on the comparator output.

16. The system of claim 15, wherein the serializer input/output expander is coupled to the controller via an Inter-Integrated Circuit (I2C) bus, wherein to generate the serialized electrical signal, the serializer input/output expander is configured to serialize the comparator output over time at a sampling frequency of the I2C bus.

17. A method comprising:

receiving, at a light sensing module, a light signal from a light-emitting diode (LED) of a storage drive, wherein the light signal is received via a light pipe coupled to the LED and affixed to a mounting tray associated with the storage drive, wherein the light pipe comprises a first coupling member which surrounds the LED and isolates the light signal from the storage drive, and wherein the mounting tray comprises a second coupling member that aligns the light pipe with a plurality of light sensing modules, wherein the second coupling member prevents ambient light from reaching the light sensing module;

generating a serialized electrical signal based on the light signals, wherein the serialized electrical signal indicates activity of the storage drive; and outputting the serialized electrical signal to a bus controller.

18. The method of claim 17, further comprising generating status information at the bus controller by de-serializing the serialized electrical signal, wherein the status information comprises one or more of:

an activity signal;

a no-activity signal;

a logging activity;

a virtual LED signal;

or a combination thereof.

19. The method of claim 18, further comprising outputting the status information by presenting a text representation or a virtual LED representation of the status information on a display element comprising a liquid crystal display (LCD) screen.

20. The method of claim 17, further comprising generating status information at the bus controller by combining activity information of multiple storage drives, and outputting the status information by presenting activities of a plurality of storage drives via a system unit LED.

* * * * *